US012215520B2

(12) United States Patent
Lin

(10) Patent No.: US 12,215,520 B2
(45) Date of Patent: Feb. 4, 2025

(54) DOOR LOCK WITH EASY-TO-INSTALL AND REMOVE INPUT INTERFACE MODULE

(71) Applicant: I-TEK METAL MFG. CO., LTD, Tainan (TW)

(72) Inventor: Hsi-Ting Lin, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 470 days.

(21) Appl. No.: 17/718,568

(22) Filed: Apr. 12, 2022

(65) Prior Publication Data

US 2023/0304320 A1 Sep. 28, 2023

(51) Int. Cl.

| | |
|---|---|
| ***E05B 47/00*** | (2006.01) |
| ***E05B 9/00*** | (2006.01) |
| ***E05B 9/08*** | (2006.01) |
| ***E05B 13/00*** | (2006.01) |
| ***E05B 15/04*** | (2006.01) |
| ***E05B 17/04*** | (2006.01) |
| ***E05B 47/06*** | (2006.01) |
| ***G07C 9/37*** | (2020.01) |

(52) U.S. Cl.

CPC ............ *E05B 13/005* (2013.01); *E05B 9/002* (2013.01); *E05B 9/082* (2013.01); *E05B 15/04* (2013.01); *E05B 17/044* (2013.01); *E05B 47/0692* (2013.01); *G07C 9/37* (2020.01); *E05B 2047/0026* (2013.01); *E05B 2047/0036* (2013.01); *E05B 2047/005* (2013.01)

(58) Field of Classification Search

CPC .... E05B 17/044; E05B 17/045; E05B 17/046; E05B 47/0657; E05B 47/0665; E05B 47/0673; E05B 47/0676; E05B 47/0684; E05B 47/0692; E05B 2047/0026; E05B 2047/0027; E05B 2047/0028; E05B 2047/005; E05B 2047/0054; E05B 2047/0056; E05B 2047/0094; E05B 2047/0095; E05B 49/00; E05B 2047/0036; E05B 13/005; E05B 9/002; E05B 9/082

See application file for complete search history.

(56) References Cited

U.S. PATENT DOCUMENTS

| | | | |
|---|---|---|---|
| 6,177,771 | B1 | 1/2001 | Kinzer et al. |
| 6,634,140 | B1 | 10/2003 | Sellman |
| 6,786,006 | B2 | 9/2004 | Kowalczyk et al. |
| 6,891,479 | B1 | 5/2005 | Eccleston |
| 7,051,403 | B2 | 5/2006 | Homberg |
| 7,061,197 | B1 | 6/2006 | Mullet et al. |
| 7,068,179 | B2 | 6/2006 | Snell et al. |

(Continued)

*Primary Examiner* — Christine M Mills
*Assistant Examiner* — Noah Horowitz
(74) *Attorney, Agent, or Firm* — Ying-Ting Chen; Law Office of Michael Chen

(57) ABSTRACT

A lock device includes a latch and inner and outer operating devices disposed on two sides of the latch device. The inner operating device includes a main board configured to control the outer operating device to or not to move a latch between the latching position and the unlatching position. The outer operating device includes a removable input interface module electrically connectable with the main board. The input interface module is configured to permit input of an unlocking identification information or an unlocking command by a physical or wireless measure.

13 Claims, 19 Drawing Sheets

(56) References Cited

U.S. PATENT DOCUMENTS

| | | | | |
|---|---|---|---|---|
| 7,091,429 | B2 * | 8/2006 | Case | E05B 37/0003 362/23.03 |
| 7,143,547 | B2 | 12/2006 | Liles, Jr. | |
| 7,234,201 | B2 | 6/2007 | Brown et al. | |
| 7,282,883 | B2 | 10/2007 | Mullet et al. | |
| 7,296,380 | B2 | 11/2007 | Backman | |
| 7,316,096 | B2 | 1/2008 | Houser et al. | |
| 7,334,442 | B2 * | 2/2008 | Case | E05B 15/02 70/278.1 |
| 7,418,800 | B1 | 9/2008 | Sellman | |
| 7,484,333 | B2 | 2/2009 | Houser et al. | |
| 7,555,867 | B2 | 7/2009 | Liles, Jr. | |
| 7,717,155 | B2 | 5/2010 | Mullet | |
| 7,774,984 | B2 | 8/2010 | Hsu | |
| 7,966,771 | B2 | 6/2011 | Bienek | |
| 7,984,631 | B2 * | 7/2011 | Case | E05B 15/02 D8/352 |
| 8,079,240 | B2 * | 12/2011 | Brown | E05B 63/0056 70/279.1 |
| 8,109,038 | B2 | 2/2012 | Houser et al. | |
| 8,169,169 | B2 | 5/2012 | Hass et al. | |
| 8,248,005 | B2 | 8/2012 | Romer | |
| 8,272,241 | B2 * | 9/2012 | Brown | G07C 9/00896 292/357 |
| 8,390,219 | B2 | 3/2013 | Houser | |
| 8,393,054 | B2 | 3/2013 | Bienek | |
| 8,407,937 | B2 | 4/2013 | Houser | |
| 8,415,902 | B2 | 4/2013 | Burris et al. | |
| 8,434,268 | B2 | 5/2013 | Nixon | |
| 8,499,495 | B2 | 8/2013 | Houser et al. | |
| 8,547,046 | B2 | 10/2013 | Burris et al. | |
| 8,601,744 | B2 | 12/2013 | Wildforster et al. | |
| 8,695,277 | B2 | 4/2014 | Romer et al. | |
| 8,826,598 | B2 | 9/2014 | Ranaudo et al. | |
| 8,875,344 | B2 | 11/2014 | Salutzki et al. | |
| 8,904,710 | B2 | 12/2014 | Romer et al. | |
| 8,963,683 | B2 | 2/2015 | Romer | |
| 9,003,630 | B2 | 4/2015 | Hufen | |
| 9,045,927 | B1 | 6/2015 | Hoffberg | |
| 9,097,051 | B2 | 8/2015 | Hellwig | |
| 9,115,526 | B2 | 8/2015 | Houser et al. | |
| 9,121,217 | B1 | 9/2015 | Hoffberg | |
| 9,129,457 | B2 * | 9/2015 | Sumcad | E05B 63/0056 |
| 9,163,446 | B2 | 10/2015 | Houser et al. | |
| 9,181,744 | B2 | 11/2015 | Salutzki et al. | |
| 9,187,942 | B2 | 11/2015 | Wildforster | |
| 9,297,194 | B2 | 3/2016 | Bienek et al. | |
| 9,464,458 | B2 * | 10/2016 | Huang | E05B 1/003 |
| 9,506,284 | B2 | 11/2016 | Braverman et al. | |
| 9,514,583 | B2 | 12/2016 | Zasowski et al. | |
| 9,631,412 | B2 | 4/2017 | Hellwig et al. | |
| 9,683,378 | B2 | 6/2017 | Houser et al. | |
| 9,695,620 | B2 | 7/2017 | Zasowski et al. | |
| 9,869,117 | B2 | 1/2018 | Houser et al. | |
| 9,995,076 | B1 | 6/2018 | Hoffberg | |
| 10,006,236 | B2 | 6/2018 | Hellwig et al. | |
| 10,024,094 | B2 | 7/2018 | Bell et al. | |
| 10,030,425 | B2 | 7/2018 | Zasowski et al. | |
| 10,030,426 | B2 | 7/2018 | Langenberg | |
| 10,077,591 | B2 | 9/2018 | Hass | |
| 10,180,023 | B2 | 1/2019 | Zasowski et al. | |
| 10,208,508 | B2 * | 2/2019 | Tien | G07C 9/00563 |
| 10,208,520 | B2 | 2/2019 | Long et al. | |
| 10,236,801 | B2 | 3/2019 | Dye et al. | |
| 10,253,540 | B2 | 4/2019 | Bell et al. | |
| 10,267,063 | B2 * | 4/2019 | Lin | E05B 47/06 |
| 10,280,670 | B2 | 5/2019 | Roberts | |
| 10,280,678 | B1 | 5/2019 | Rendon, Jr. et al. | |
| 10,304,272 | B2 | 5/2019 | Kvinge et al. | |
| 10,344,502 | B2 | 7/2019 | McKibben et al. | |
| 10,415,301 | B2 | 9/2019 | Kuan | |
| 10,472,873 | B2 | 11/2019 | Ladha et al. | |
| 10,559,151 | B2 | 2/2020 | Kvinge et al. | |
| 10,704,310 | B1 | 7/2020 | Barbon et al. | |
| 10,704,313 | B2 | 7/2020 | Houser et al. | |
| 10,724,288 | B2 | 7/2020 | Baumgarte | |
| 11,643,845 | B2 * | 5/2023 | Uyeda | E05B 27/0003 70/278.1 |
| 11,674,335 | B2 * | 6/2023 | Kumar | E05B 47/0661 70/278.7 |
| 11,970,880 | B2 * | 4/2024 | Lin | E05B 47/0012 |
| 12,077,985 | B2 * | 9/2024 | Clark | E05B 17/002 |
| 2005/0154612 | A1 | 7/2005 | Smith et al. | |
| 2007/0256362 | A1 | 11/2007 | Hansen | |
| 2013/0009785 | A1 | 1/2013 | Finn et al. | |
| 2014/0255252 | A1 | 9/2014 | Stratman et al. | |
| 2016/0348415 | A1 | 12/2016 | Baumgarte | |
| 2018/0334841 | A1 | 11/2018 | Langenberg et al. | |
| 2019/0043296 | A1 | 2/2019 | Baumgarte et al. | |
| 2019/0145138 | A1 | 5/2019 | Eickhoff | |
| 2019/0153764 | A1 | 5/2019 | Baumgarte | |
| 2019/0264486 | A1 | 8/2019 | Toloday et al. | |
| 2019/0319557 | A1 | 10/2019 | Dye et al. | |
| 2019/0338576 | A1 | 11/2019 | Wang | |
| 2019/0345738 | A1 | 11/2019 | McKibben et al. | |
| 2019/0383080 | A1 | 12/2019 | Barbon et al. | |
| 2020/0190885 | A1 | 6/2020 | Coleman | |
| 2020/0256108 | A1 | 8/2020 | Shetty et al. | |
| 2021/0023248 | A1 | 1/2021 | Townsend et al. | |
| 2021/0056791 | A1 | 2/2021 | Shen | |

* cited by examiner

DOOR LOCK WITH EASY-TO-INSTALL AND REMOVE INPUT INTERFACE MODULE

BACKGROUND OF THE INVENTION

The present invention relates to a door lock and, more particularly, to a door lock with an input interface module that is easy to install and remove to permit easy and rapid replacement.

Door locks are generally installed on doors to control opening/closing. When a door is closed and a door lock mounted on the door is in a locked state, a latch of the door lock is coupled with a groove in a door frame, avoiding opening of the door. When the door lock is unlocked, a handle (an outer handle on an outer side or an inner handle on an inner side) can be operated to retract the latch, permitting opening of the door. Thus, the door lock cooperates with the door to provide door access control.

Many currently available electronic door locks includes a mechanical mechanism cooperating electronic control to permit or prohibit locking or unlocking. These electronic door locks generally include an input interface device on an outer side thereof to permit a user to input an identification information. The input interface device may have various forms, such as physical buttons, a biological feature pick-up device, a wireless input device using wireless signals (such as Wi-Fi, Bluetooth, RFID, NFC, etc.), etc. Thus, a user can input corresponding identification information for unlocking. Manufacturers generally sell different door locks (with various types of the input interface devices) as separate goods. Thus, the manufacturers require a considerable inventory of door locks with various input interface devices, increasing the overall manufacturing cost.

BRIEF SUMMARY OF THE INVENTION

A door lock according to the present invention includes:

- a latch device including a latch movable between a latching position and an unlatching position;
- an inner operating device mounted to a side of the latch device and is configured to move the latch between the latching position and the unlatching position, wherein the inner operating device includes an inner escutcheon having a maintenance hole;
- an outer operating device mounted to another side of the latch device and is configured to move the latch between the latching position and the unlatching position, wherein the outer operating device includes an outer escutcheon having a mounting area, and wherein the mounting area includes a socket aligned with the maintenance hole;
- a main board fixed in the inner escutcheon, wherein the main boar is configured to control the outer operating device to or not to move the latch between the latching position and the unlatching position;
- a fastener rotatably coupled with the socket; and
- an input interface module removably mounted in the mounting area and electrically connectable with the main board, wherein the input interface module is configured to permit input of an unlocking identification information or an unlocking command by a physical or wireless measure, wherein the input interface module includes a connecting member, wherein when the maintenance hole is revealed, the fastener is rotatable to tighten or loosen the connecting member of the input interface module, wherein when the connecting member is tightened by the fastener, the input interface module is secured in the mounting area, and wherein w % ben the fastener is disengaged from the connecting member, the input interface module is removable from the outer escutcheon.

The input interface module according to the present invention can be rapidly and easily installed or removed after detaching the protective cover without removing the inner operating device, the outer operating device, and the latch device. This is extremely convenient when maintenance of the input interface module or replacement of an input interface module of another type (such as including an input device with buttons, a biological feature input device, etc.) is required. Also, the manufacturers can benefited in reduction of the manufacturing costs by modularization. The input interface module according to the present invention can be installed or removed after the protective cover at the inner side of the door is detached from the inner escutcheon. This provides an anti-theft effect (preventing the input interface module from being stolen) and safety while permitting easy and rapid installation and removal of the input interface module.

In an example, the input interface module is an input device using a plurality of buttons, a biological feature input device, or a wireless input device.

In an example, the input device using the plurality of buttons includes a plurality of physical buttons or a touch screen with a plurality of virtual buttons displayed on the touch screen. The biological feature input device is a fingerprint input device, a facial feature input device, an iris image input device, or an audio input device. The wireless input device is a device using Wi-Fi, Bluetooth, radio frequency identification, or near field communication.

In an example, the door lock further comprises a power supply module and a protective cover. The inner escutcheon includes an inner assembling room and an outer sidewall contiguous to the inner assembling room. The inner escutcheon further includes a chamber extending from the outer sidewall and spaced from the inner assembling room. The inner escutcheon further includes a vertical inner wall contiguous to the chamber and spaced from the outer sidewall. The power supply module is received in the chamber. The main board is securely disposed in the inner assembling room. The power supply module is electrically connected to and provides power to the main board. The protective cover is removably coupled to the inner escutcheon and covering the chamber. When the protective cover is detached from the inner escutcheon, the power supply module is movable to reveal the maintenance hole.

In an example, the door lock further comprises a connecting cable having an inner end and an outer end. The inner escutcheon includes an inner assembling room and an outer sidewall contiguous to the inner assembling room. The inner escutcheon further includes a chamber extending from the outer sidewall and spaced from the inner assembling room. The inner escutcheon further includes a vertical inner wall contiguous to the chamber and spaced from the outer sidewall. The main board is securely disposed in the inner assembling room and includes an inner connecting seat extending into the chamber. The vertical inner wall includes a slot spaced from the maintenance hole. The inner end of the connecting cable extends through the slot and is in electrical connection with the inner connecting seat. The outer end of the connecting cable is in electrical connection with the input interface module.

The main board for controlling operation of the clutch and/or identification of the identification information is separate from the input interface module and is mounted in the inner assembling room of the inner escutcheon, reducing the chance of cracking or destruction of the lock device.

In an example, the outer escutcheon further includes a vertical wall contiguous to the mounting area. The outer escutcheon further includes a slot extending from the vertical wall. The input interface module further includes an outer connecting seat adjacent to the slot. The outer end of the connecting cable extends through the slot of the outer escutcheon and is in electrical connection with the outer connecting seat.

In an example, the inner operating device further includes an inner return mechanism and an inner handle operatively connected to the inner return mechanism. The inner return mechanism is securely disposed to the inner escutcheon and is located in the inner assembling room. The main board is located between the inner return mechanism and the outer sidewall of the inner escutcheon. The inner return mechanism biases the inner handle to retain the latch in the latching position.

In an example, the door lock further comprises a disengagement prevention member, wherein the outer escutcheon further includes a vertical wall contiguous to the mounting area. The socket extends from the vertical wall towards the latch device. The socket further includes a groove. The fastener includes a threaded section and a head. The head is located outside of the socket and faces the inner operating device. The threaded section is located in the groove. The disengagement prevention member and the fastener are jointly and rotatably mounted around the threaded section.

The fastener cooperates with the disengagement prevention member that is rotatably and non-removably disposed on the socket, such that the input interface module can be installed and removed more conveniently.

In an example, the input interface module further includes:

- a box including a fixing hole and a compartment spaced from the fixing hole, wherein the box further includes a coupling portion at a bottom thereof, wherein the outer escutcheon further includes a vertical wall and a bottom wall contiguous to the vertical wall and the mounting area, wherein the outer escutcheon further includes a slot extending from the vertical wall and an insertion groove extending from the bottom wall, wherein the coupling portion of the box is removably coupled with the insertion groove, and wherein the connecting member is coupled with the fixing hole;
- a circuit board securely disposed in the box, wherein the circuit board includes an outer connecting seat received in the compartment; and
- a connecting cable including an outer end and an inner end, wherein the outer end extends through the slot of the outer escutcheon and is in electrical connection with the outer connecting seat, and wherein the inner end of the connecting cable is in electrical connection with the main board.

In an example, the box further includes a stop portion formed on an outer periphery of the fixing hole. The connecting member includes an enlarged head having non-circular cross sections. The enlarged head abuts against the stop portion to prevent rotation of the connecting member relative to the fixing hole.

In an example, the door lock further comprises a clutch in electrical connection with the main board. The clutch includes:

- an outer box;
- an intermediate member pivotably connected to the outer box, wherein the intermediate member is configured to couple with an outer handle of the outer operating device to pivot therewith;
- a torsion spring disposed between the intermediate member and the outer box, wherein the torsion spring biases the intermediate member to an initial position; and
- a coupling member pivotably mounted between the intermediate member and the outer box, wherein the coupling member is configured to be operatively connected to the latch of the latch device, wherein the main board controls the coupling member to or not to pivot jointly with the intermediate member, wherein when the coupling member and the intermediate member are jointly pivotable, pivotal movement of the outer handle causes the latch to move from the latching position or the unlatching position, and wherein when the coupling member is not jointly pivotable with the intermediate member, pivotal movement of the outer handle is incapable of causing movement of the latch.

The clutch and the inner and outer operating devices may be varied without altering the latch device, providing electronic control of the mechanical type latch device to achieve the locking function (such that the latch cannot move to the unlatching position by operating the outer handle) or the unlocking function (such that the latch can move to the unlatching position by operating the outer handle). Thus, redesigning and corresponding manufacturing of the latch device for electronic control are not required. Namely, currently available mechanical type latch device can be used, reducing the costs of manufacturing and design. For general consumers, the mechanical type latch device can still be used to achieve electronic control by replacing the inner and outer operating devices.

In an example, the clutch further includes a clutch member movably coupled to the intermediate member and jointly pivotable with the intermediate member. The clutch member includes an engaging arm. The clutch member is movable along a pivotal axis of the intermediate member between an engagement position and a disengagement position. When the clutch member is in the engagement position, the coupling member and the intermediate member are jointly pivotable. When the clutch member is in the disengagement position, the coupling member is incapable of pivoting jointly with the intermediate member.

In an example, the clutch further includes a driving device in electrical connection with the main board. The driving device includes:

- a motor configured to be driven by the main board;
- a shaft configured to be driven by the motor to rotate, wherein the shaft includes an outer periphery having a threaded section;
- a helical elastic element in threading connection with the threaded section of the shaft, wherein the helical elastic element is compressible and includes a first tang and a second tang, wherein the helical elastic element moves along a longitudinal axis of the shaft when the shaft rotates; and
- a sliding block including a compartment having first and second walls opposite to each other, wherein the sliding block further includes an activation end located outside of the compartment, wherein the second wall is located between the first wall and the activation end along the longitudinal axis of the shaft, wherein the sliding block further includes an extension arm extending from the activation arm, wherein the shaft is received in the compartment, wherein the first tang of the helical elastic element is adjacent to the first wall, wherein the second tang of the helical elastic element is adjacent to the second wall, wherein the first tang and the second tang are configured to be restricted and retained in place by the first and second walls when the shaft rotates, wherein when the helical elastic element moves and the first tang abuts against the first wall, the sliding block moves away from the intermediate member along the longitudinal axis of the shaft, and the clutch member moves to the disengagement position, wherein when the helical elastic element moves and the second tang abuts against the second wall, the sliding block moves towards the intermediate member along the longitudinal axis of the shaft, and the clutch member moves to the engagement position, wherein when the clutch member is not aligned with the engaging groove and the helical elastic element moves towards the intermediate member, a section of the helical elastic element between the threaded section and the second tang is compressed by the threaded section and the second wall.

In an example, the threaded section of the shaft has one turn, wherein the helical elastic element is a compression spring. Each of the first and second tangs is rectilinear and extends in a tangential direction of an associated one of two ends of the compression spring.

The present invention will become clearer in light of the following detailed description of illustrative embodiments of this invention described in connection with the drawings.

Figure 1:
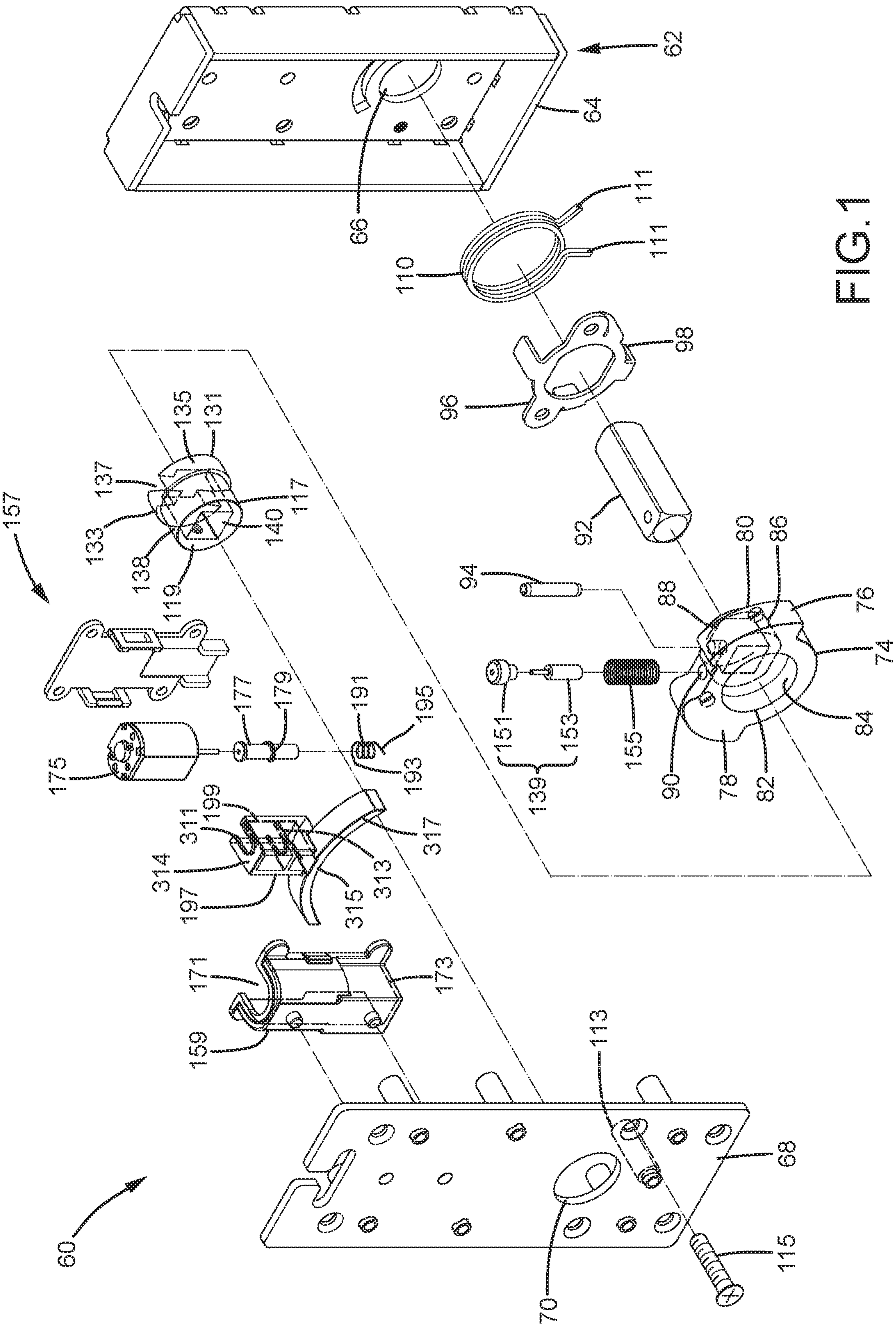
FIG. 1 is an exploded, perspective view of a clutch utilized in a door lock of an embodiment according to the present invention.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "upper", "lower", "bottom", "inner", "outer", "side", "end". "portion", "section", "longitudinal", "axial", "radial". "circumferential", "vertical". "horizontal", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 14:
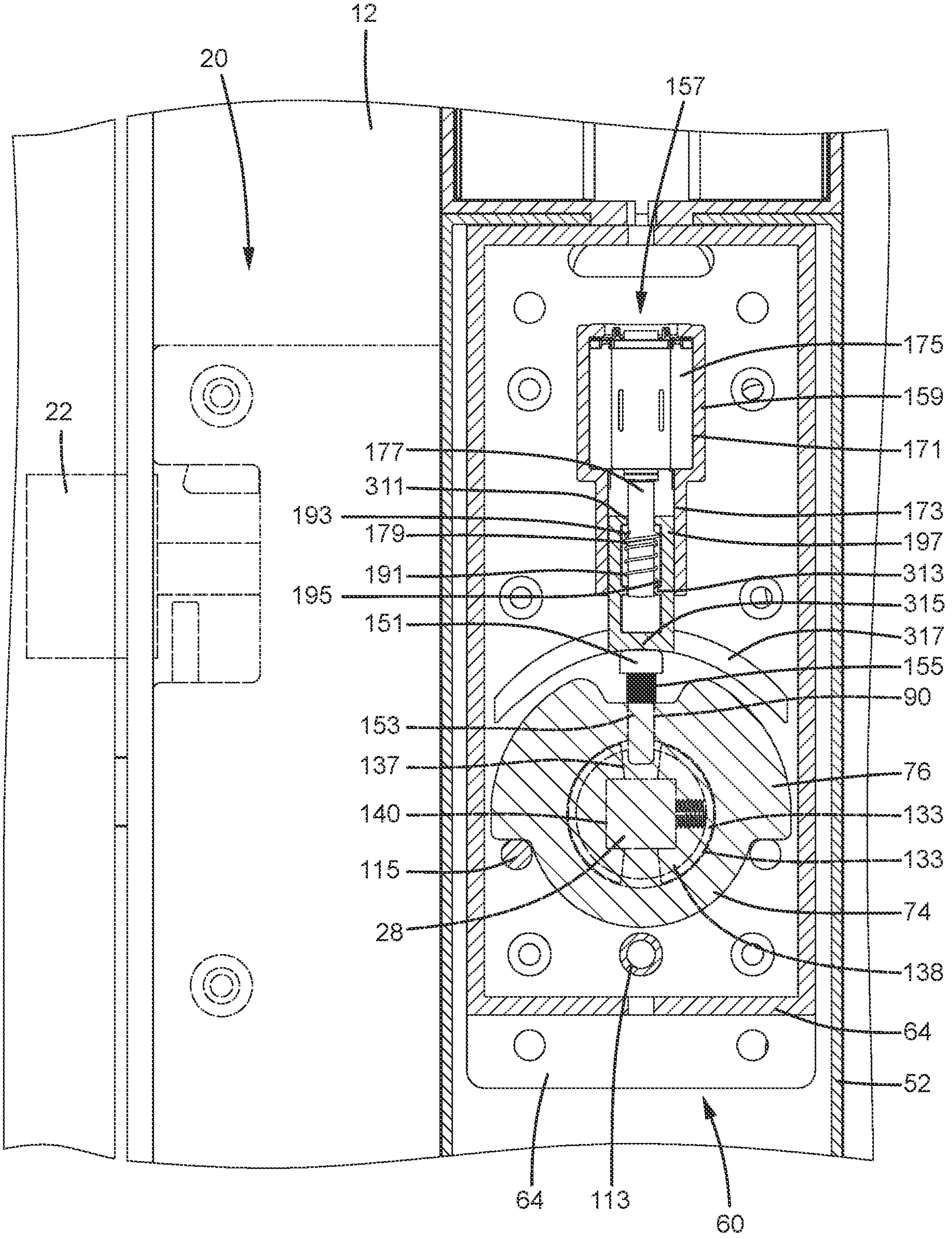
FIG. 14 is a cross sectional view taken along section line 14-14 of FIG. 13.
Figure 15:
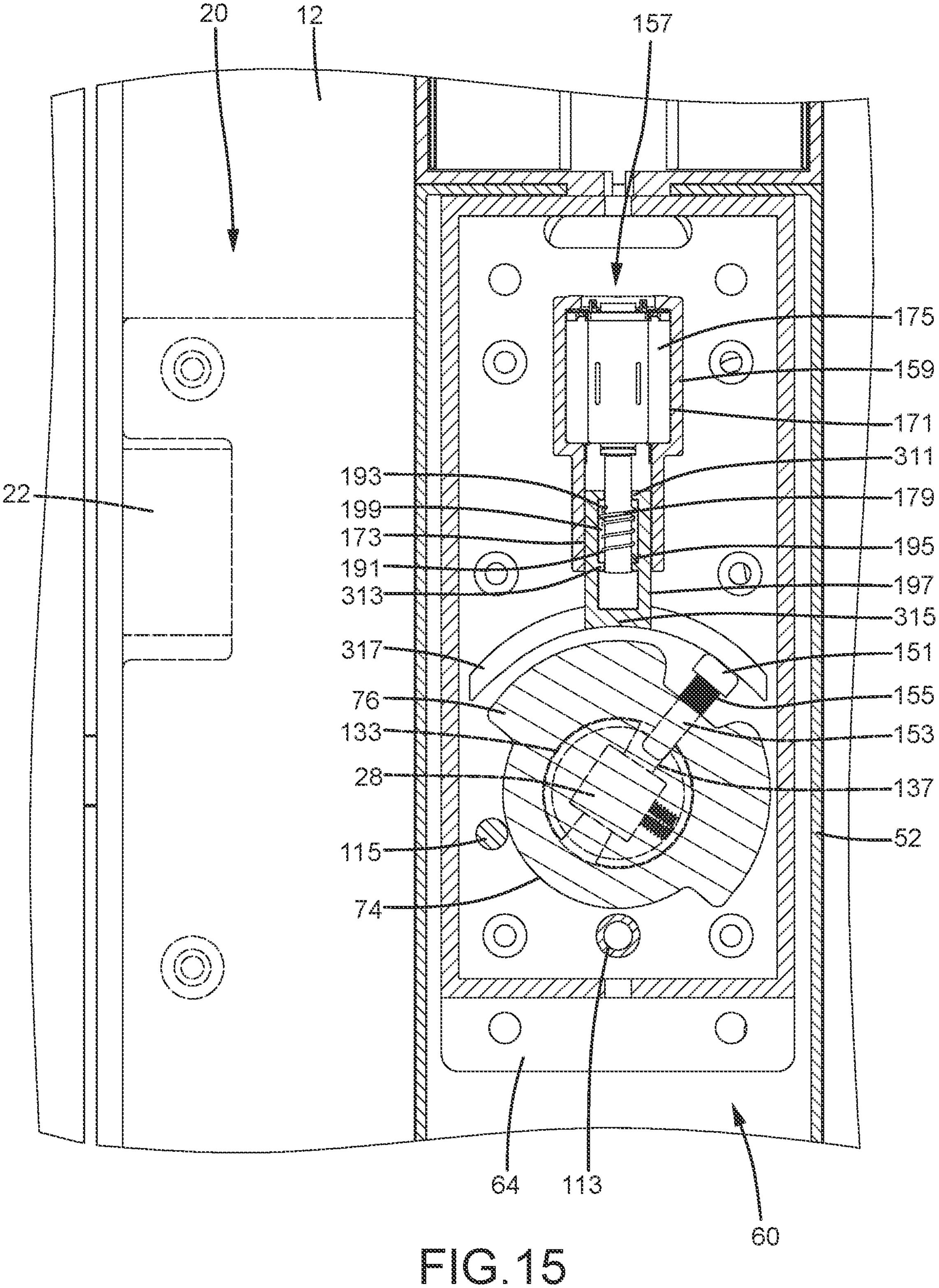
FIG. 15 is a view similar to FIG. 14 with the clutch in the disengagement position and with the outer handle pivoted.

The present invention relates to a door lock with an easy-to-install and remove input interface module and, more particularly, to a door lock with an input interface module that is easy to install and remove to thereby permit rapid and easy installation and removal of the input interface module used for inputting an identification information required for unlocking or an unlocking command while providing safety and reliability. FIGS. 1-10 show a lock device 10 of an embodiment according to the present invention. The lock device 10 includes a latch device 20 mounted in a door 12 and outer and inner operating devices 513 and 411 disposed on two sides of the door 12. The latch device 20 includes a latch 22 movable between a latching position (FIGS. 10-12 and 14) and an unlatching position (FIG. 15). The latch 22 is operatively connected to an actuating member 26 that is pivotable. A driving rod 28 is connected to the actuating member 26 to pivot jointly.

The outer operating device 513 includes an outer escutcheon 515 securely mounted to an outer side of the door 12 and an outer handle 514. In this embodiment, the outer handle 514 is pivotable and substantially L-shaped. The outer escutcheon 515 includes an outer sidewall 517 (FIG. 4) and an outer assembling room 539 (FIG. 6) contiguous to the outer sidewall 517. The outer escutcheon 515 further includes a mounting area 519 spaced from the outer assembling room 539, a vertical wall 531 contiguous to the mounting area 519 and spaced from the outer sidewall 517 in a thickness direction, and a bottom wall 533 extending between the vertical wall 531 and the outer sidewall 517. The vertical wall 531 includes a slot 532 extending towards a side of the latch device 20 and a socket 535 extending towards the side of the latch device 20. The socket 535 defines a groove 537. The bottom wall 533 includes an insertion groove 540 extending to the outer assembling room 539.

The outer escutcheon 515 includes two coupling pegs 518 extending beyond the outer assembling room 539 and located on upper and lower ends of the outer escutcheon 515, respectively. The outer escutcheon 515 abuts an outer side of the door 12. Furthermore, the door 12 includes two aligned first through-holes 12A (FIGS. 7 and 8) aligned with the socket 535 and two aligned second through-holes 12B (FIGS. 7 and 8) corresponding to the slot 532. One of the two first through-holes 12A is located between another of the two first through-holes 12A and the socket 535. The two coupling pegs 518 are coupled to the door 12.

Figure 2:
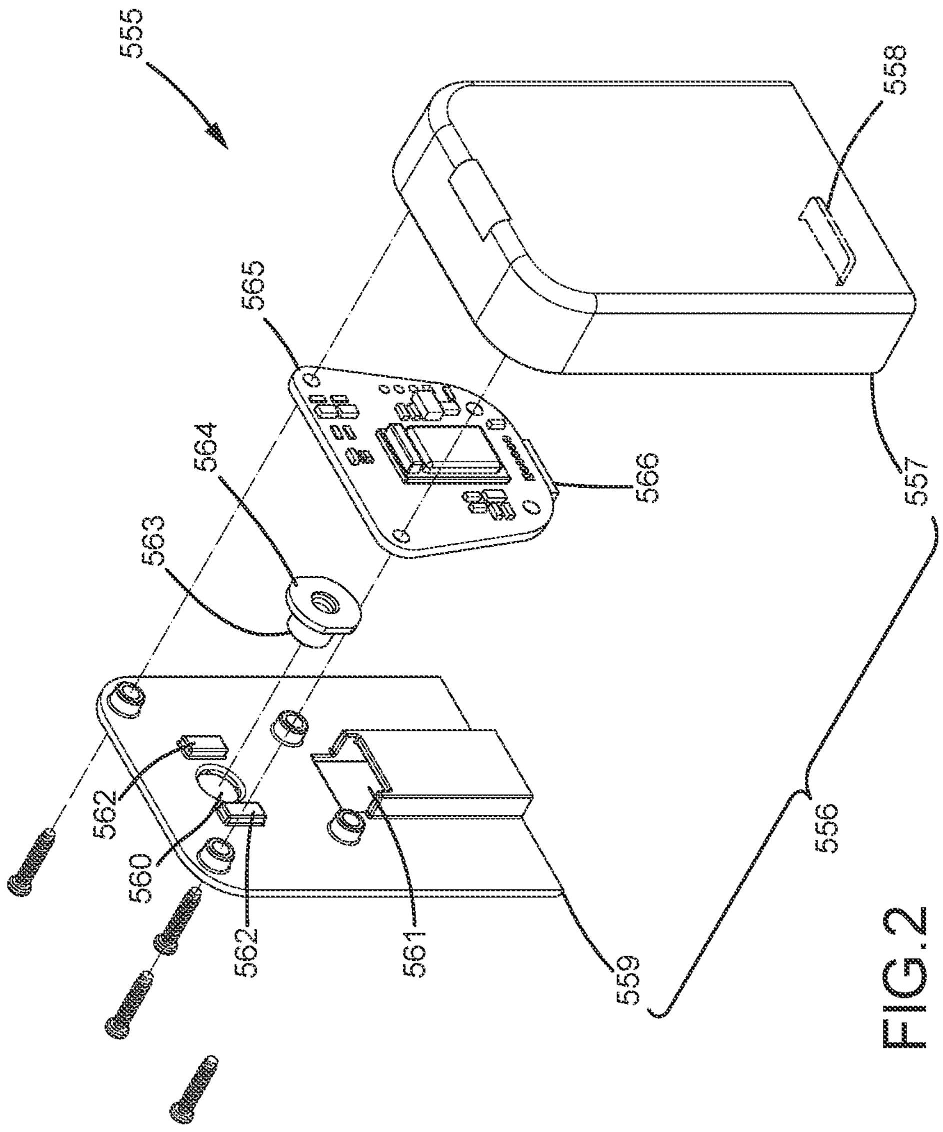
FIG. 2 is an exploded, perspective view of an input interface module utilized in the door lock of the embodiment according to the present invention.
Figure 3:
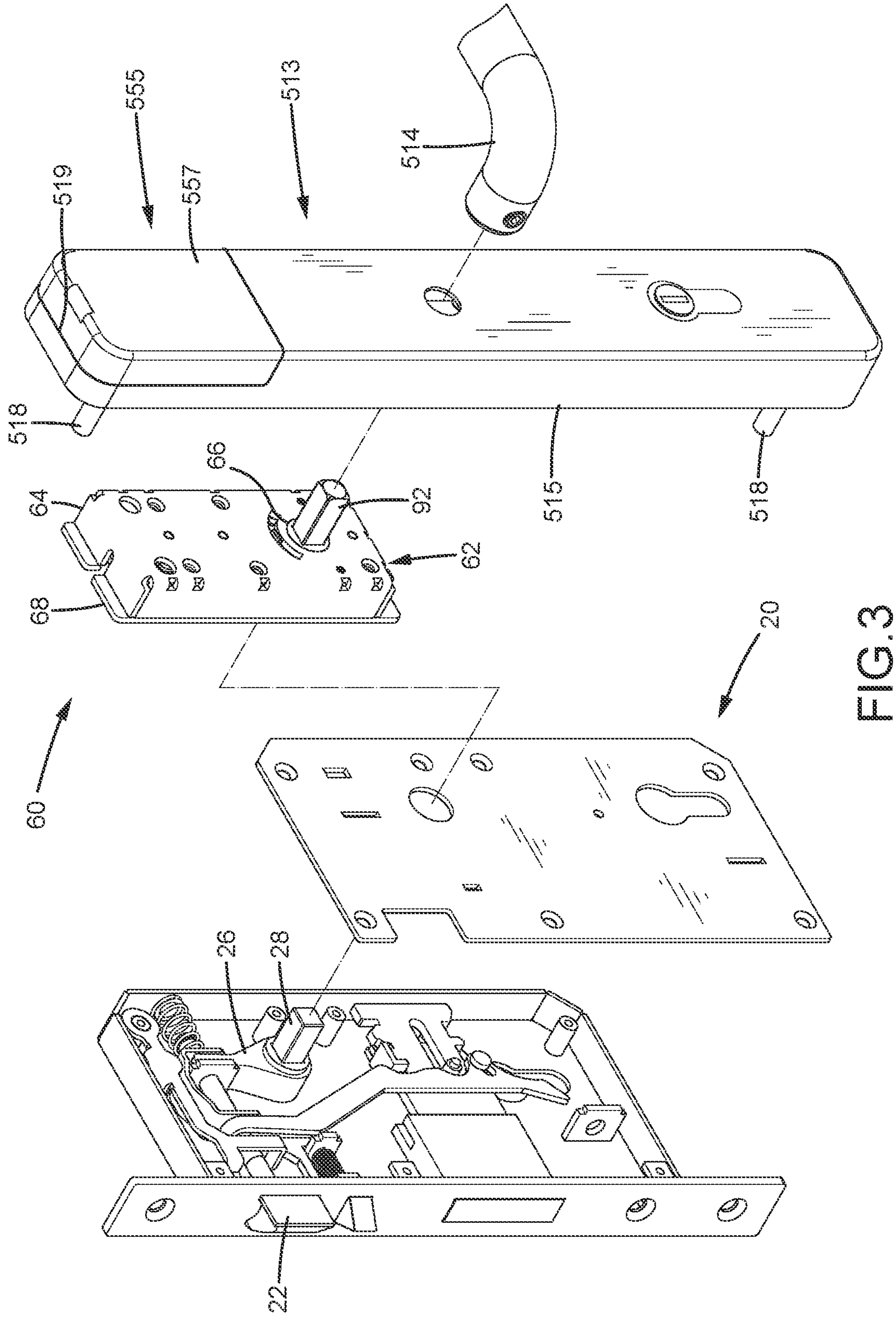
FIG. 3 is an exploded, perspective view illustrating a latch device and an outer operating device of the door lock of the embodiment according to the present invention.
Figure 4:
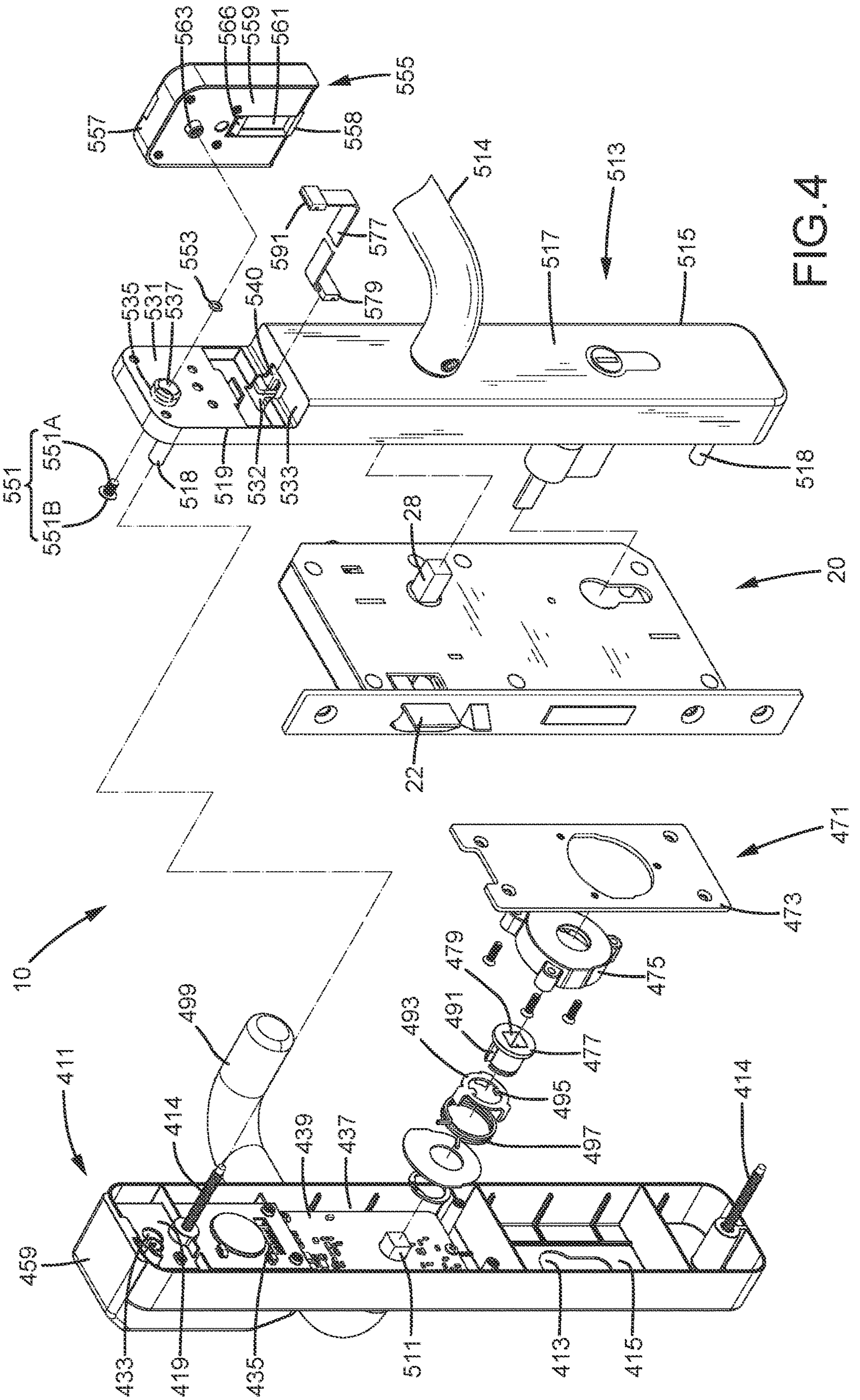
FIG. 4 is an exploded, perspective view of the door lock of the embodiment according to the present invention.

The outer operating device 513 further includes an input interface module 555 removably mounted in the mounting area 519. The input interface module 555 includes a box 556 that can be comprised of a first casing part 557 and a second casing 559 secured to the first casing part 557 by screws (FIGS. 2 and 4). The first casing part 557 includes a coupling portion 558 protruding from a bottom thereof. The second casing part 559 includes a fixing hole 560 (FIGS. 2 and 7) extending from an outer side through an inner side of the second casing part 559. The second casing part 559 further includes a compartment 561 (FIGS. 2, 4 and 7) between the coupling portion 558 and the fixing hole 560 in a vertical direction. The second casing part 559 further includes two stop portions 562 (FIG. 2) formed on the inner side thereof and located on opposite sides of the fixing hole 560.

The input interface module 555 further includes a connecting member 563 for connection with the second casing part 559 and a circuit board 565 (FIGS. 2, 4, 7 and 8). The connecting member 563 includes an enlarged head 564 having non-circular cross sections larger than the fixing hole 560. An end of the connecting member 563 extends through the fixing hole 560 to a position beyond the second casing part 559. The enlarged head 564 abuts the inner side of the second casing part 559 and the two stop portions 562. Thus, the connecting member 563 cannot rotate relative to the second casing part 559.

The circuit board 565 includes an outer connecting seat 566 (FIGS. 2, 4, 7, and 8) sandwiched between the first casing part 557 and the second casing part 559. Furthermore, the outer connecting seat 566 is received in the compartment 561. Thus, an end of the connecting member 563 and the outer connecting seat 566 are outside of the box 556.

The input interface module 555 is received in the mounting area 519. The coupling portion 558 is received in the insertion groove 540. The end of the connecting member 563 outside of the box 556 is located in the groove 537 of the socket 535.

Figure 7:
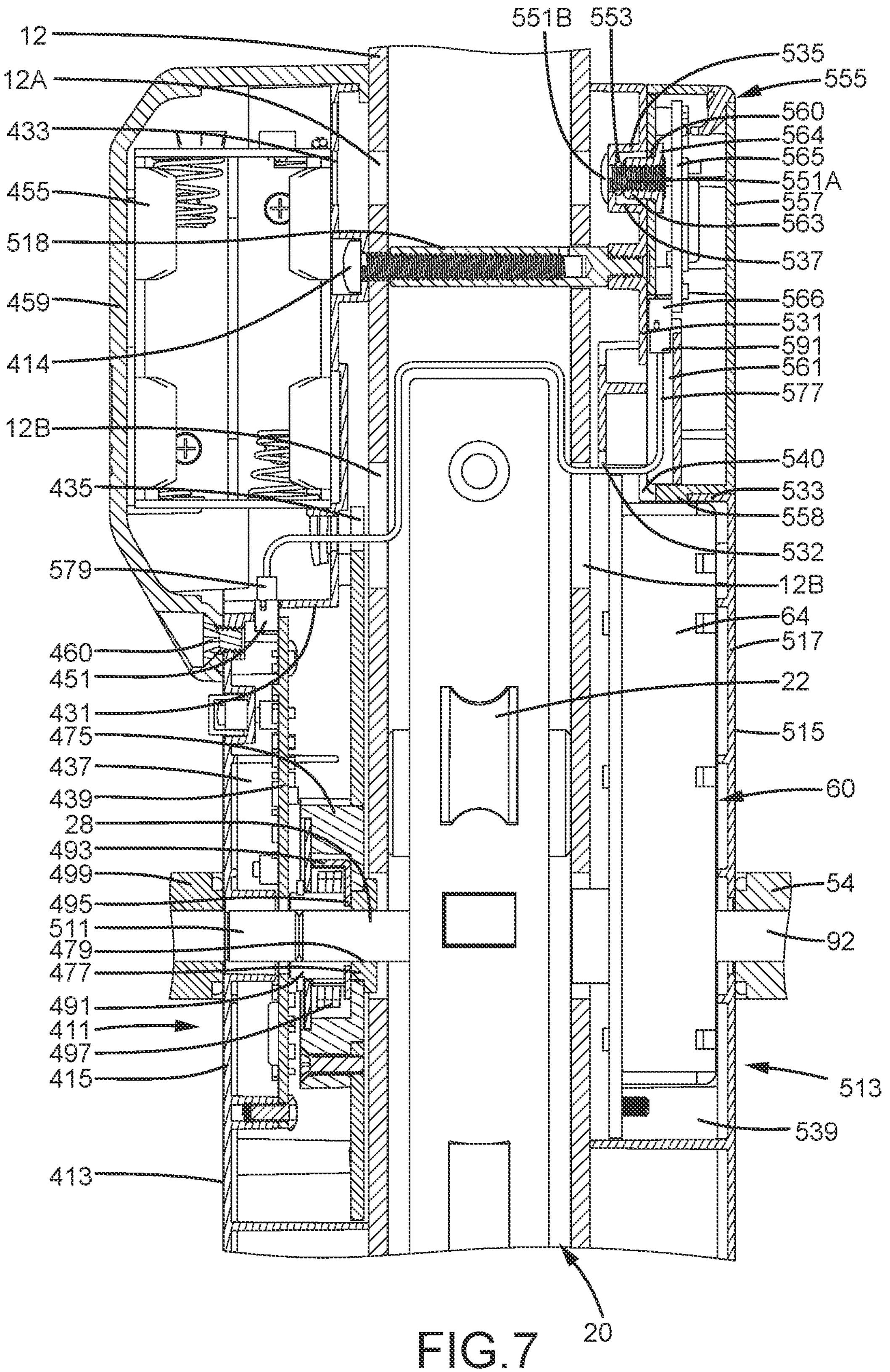
FIG. 7 is a partial, cross sectional view taken along section line 7-7 of FIG. 6.
Figure 8:
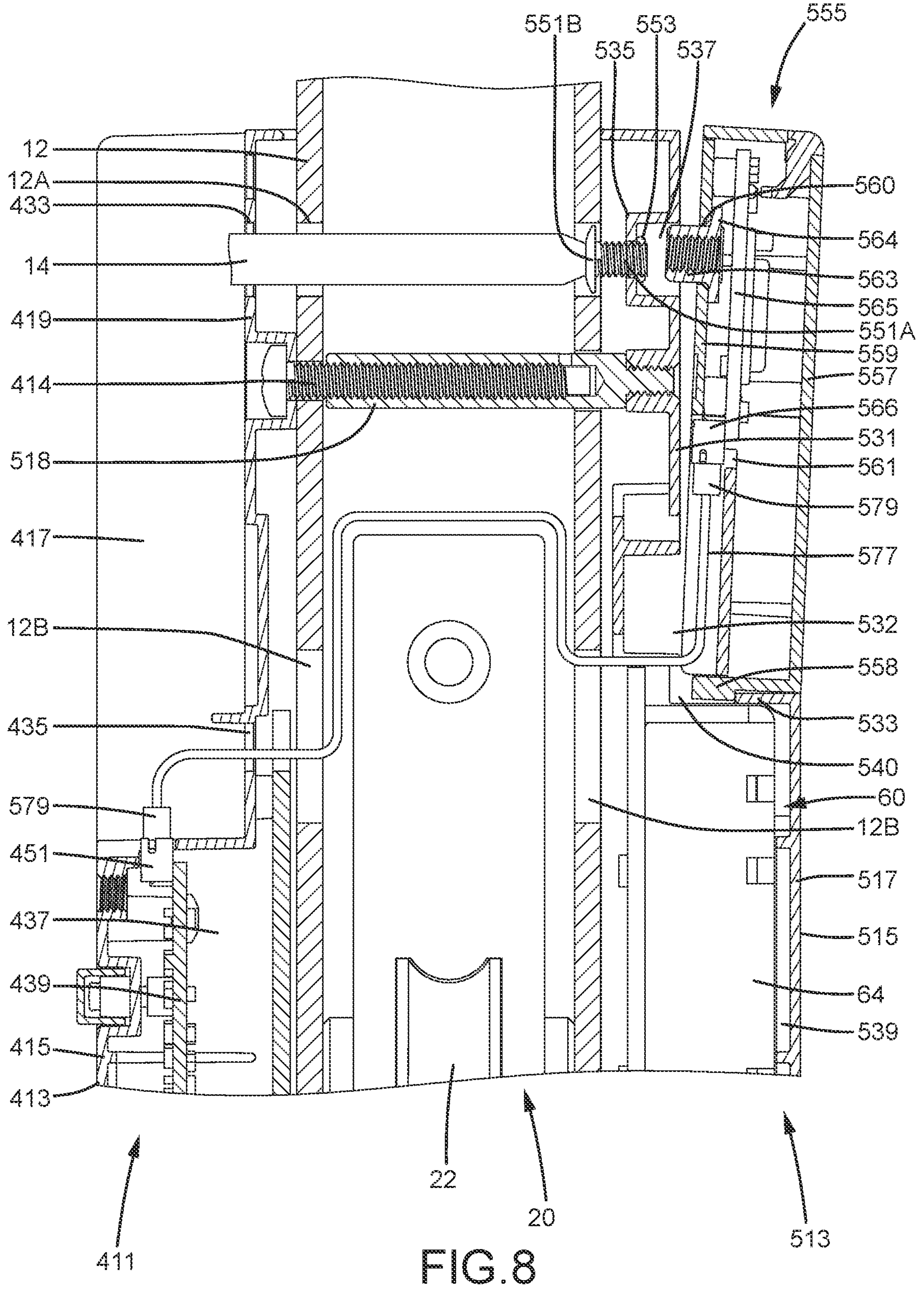
FIG. 8 is a diagrammatic cross sectional view illustrating the input interface module after removing a protective cover and a power supply module.

Furthermore, a fastener 551 is rotatably received in the socket 535 and includes a threaded section 551A and ahead 551B. The head 551B is outside of the socket 535. The threaded section 551A is received in the groove 537 of the socket 535. A disengagement prevention member 553 is disposed around the threaded section 551A and is located in the groove 537. The disengagement prevention member 553 can be, but not limited to, an O-ring made of rubber. The disengagement prevention member 553 is less likely to disengage from the socket 535 (FIGS. 7 and 8). The threaded section 551A of the fastener 551 can be in threading connection or detached from the connecting member 563 of the input interface module 555. When the fastener 551 and the connecting member 563 are in a tightened state, the input interface module 555 cannot be removed from the outer escutcheon 515 (FIG. 7). On the other hand, when the fastener 551 disengages from the connecting member 563, the input interface module 555 can be removed from the outer escutcheon 515 (FIG. 8).

Figure 17:
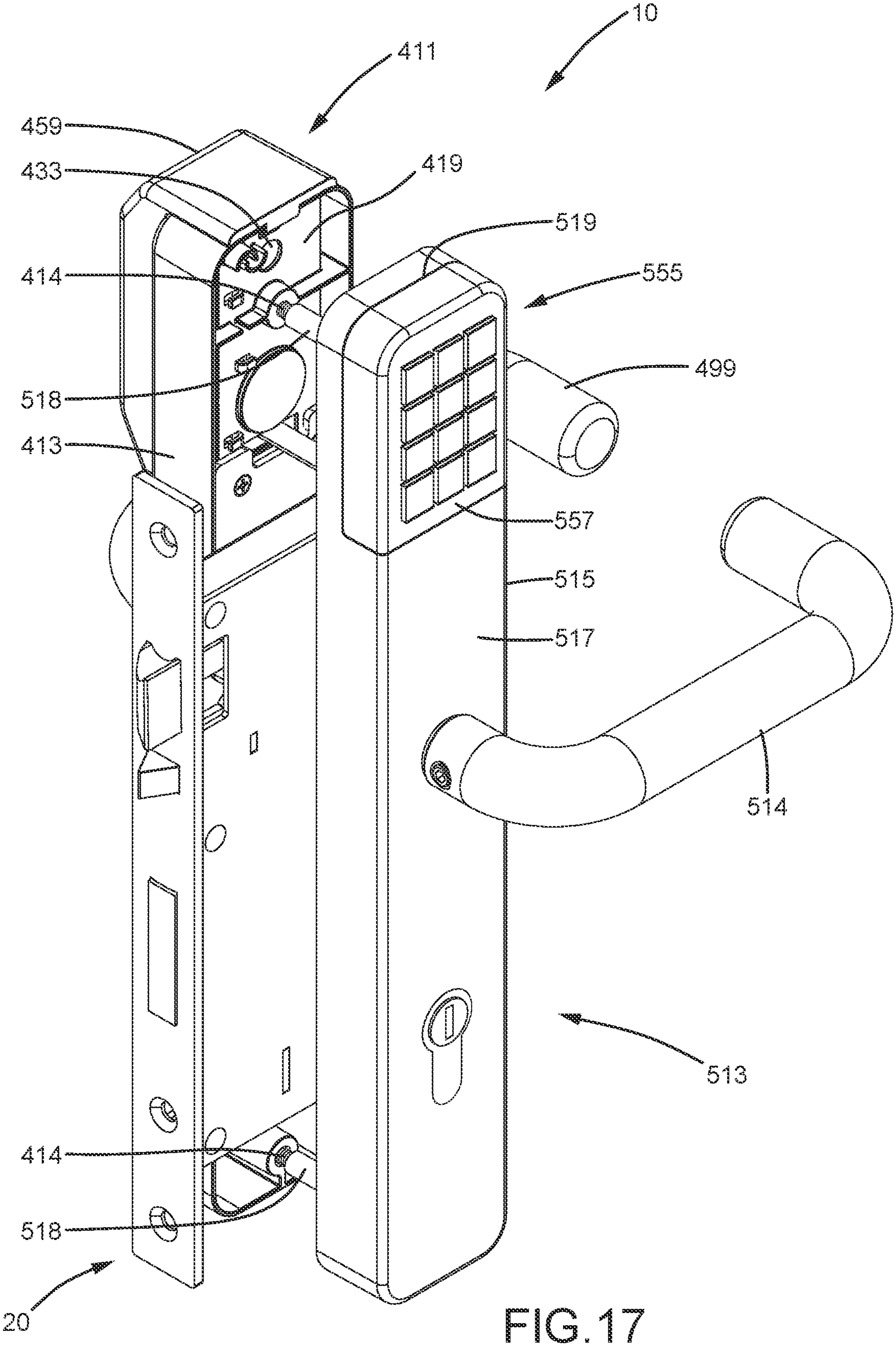
FIG. 17 is a diagrammatic view of a door lock including an input interface module having a plurality of physical buttons.
Figure 18:
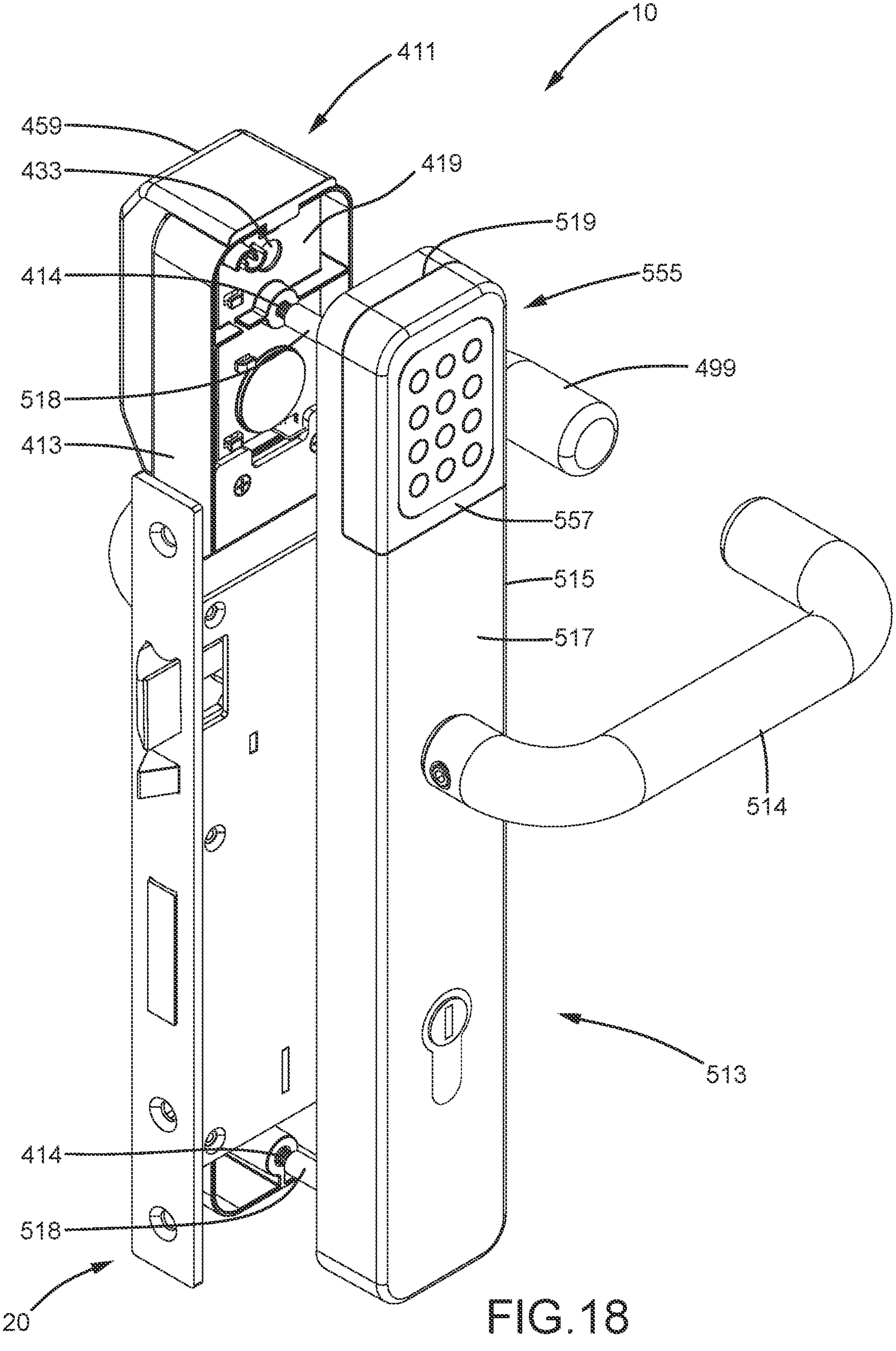
FIG. 18 is a diagrammatic view of a door lock including an input interface module having a touch screen and a plurality of virtual buttons.
Figure 19:
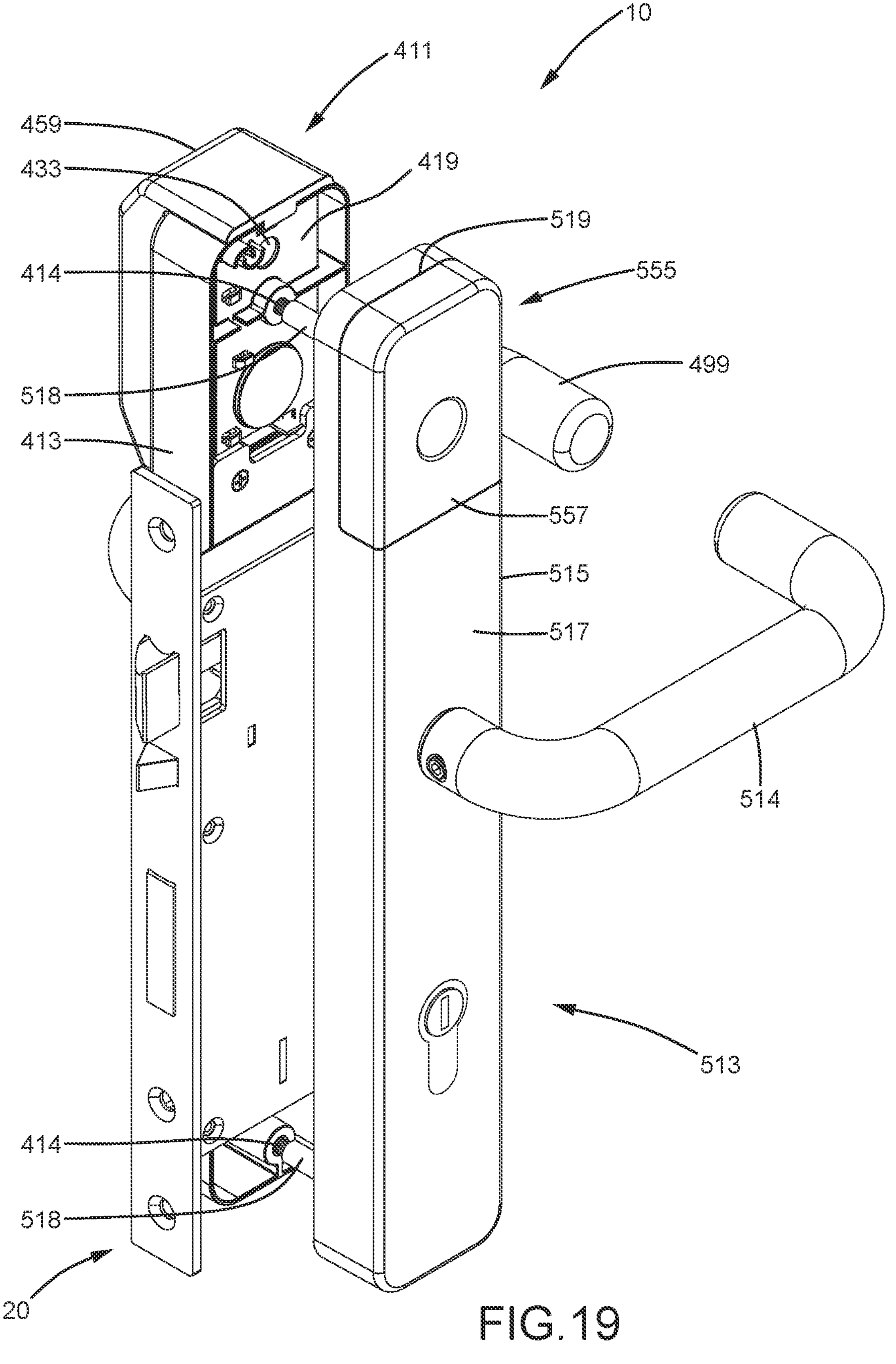
FIG. 19 diagrammatic view of a door lock including an input interface module having a biological feature input device in the form of a fingerprint pick-up device.

It is noted that the input interface module 555 can be a wireless input device, such as Wi-Fi, Bluetooth, radio frequency identification (RFID), near field communication (NFC), etc. Alternatively, the input interface module 555 can include buttons (FIGS. 17 and 18) or a biological feature input device (FIG. 19), providing physical input. As shown in FIG. 17, physical buttons (digital numbers and/or symbols) can be disposed on the surface of the fist casing part 557 for inputting a password for unlocking purposes via cooperation with the circuit board 565. As shown in FIG. 18, virtual buttons on a touch screen can be used to input an identification information, such as a password, for unlocking purposes via cooperation with the circuit board 565. The biological feature input device can be a device permitting input of a fingerprint, a facial image, an iris image, or sound. Thus, it can be appreciated that the input interface module 555 according to the present invention permits a user to input the identification information or an unlocking command through a physical or wireless manner. For example, the unlocking command can be outputted to the input interface module 555 after a smart mobile device identifies the identification information as being correct.

Figure 5:
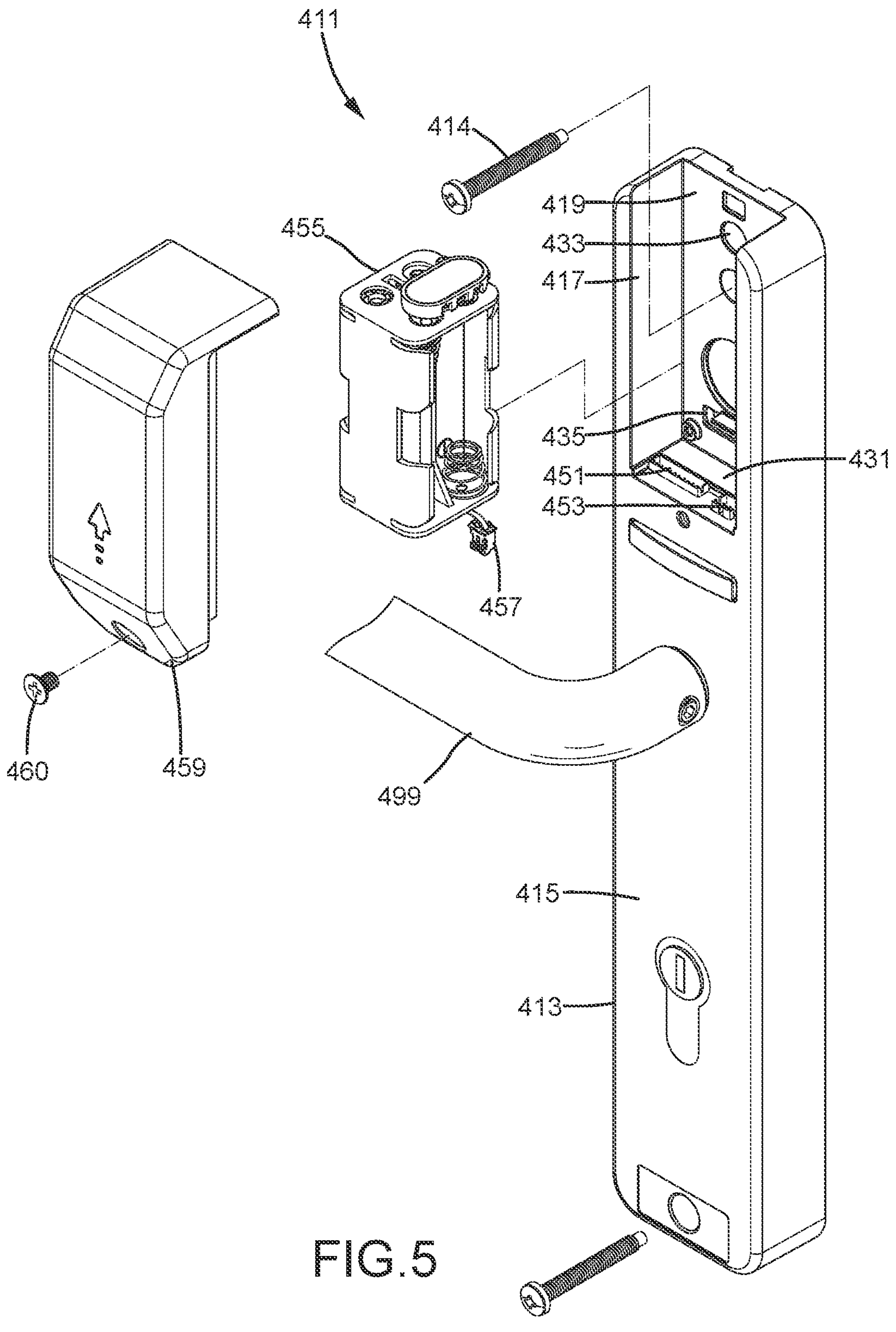
FIG. 5 is an exploded, perspective view of an inner operating device of the door lock of the embodiment according to the present invention.
Figure 6:
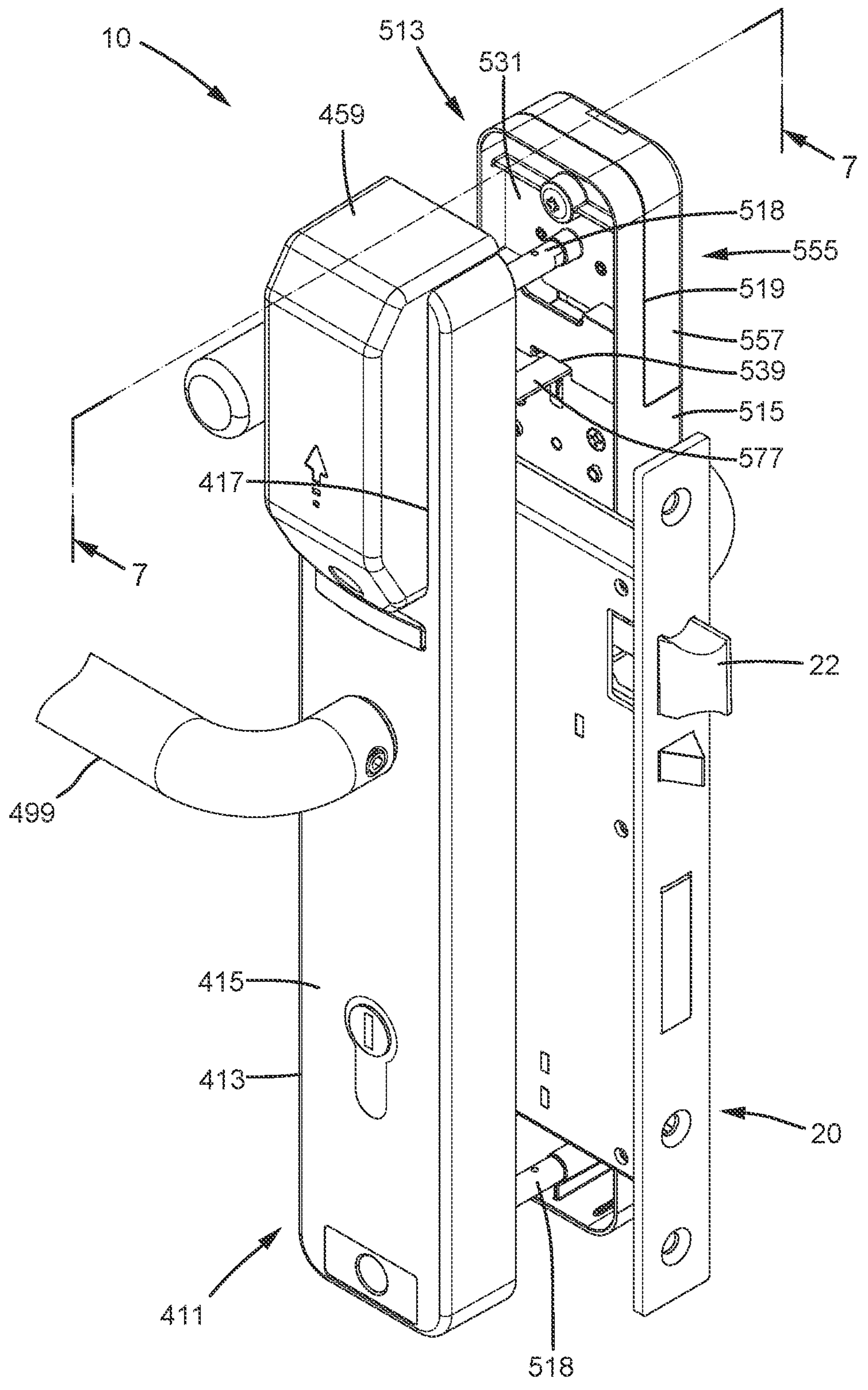
FIG. 6 is a perspective view of the door lock of the embodiment according to the present invention.

The inner operating device 411 includes an inner escutcheon 413 mounted to the inner side of the door 12 and an inner return mechanism 471 (FIG. 4) securely mounted to an inner side of the inner escutcheon 413. The inner escutcheon 413 includes an outer sidewall 415 and an inner assembling room 437 contiguous to the outer sidewall 415. The inner escutcheon 413 further includes a chamber 417 (FIG. 5) extending from the outer sidewall 415 towards the latch device 20 and spaced from the inner assembling room 437. The inner escutcheon 413 further includes a vertical inner wall 419 and a bottom wall 431 extending between the outer sidewall 415 and the vertical inner wall 419. The bottom wall 431 is located between the inner assembling room 437 and the chamber 417. The vertical inner wall 419 includes a maintenance hole 433 and a slot 435. The maintenance hole 433 is aligned with the socket 535 and the two first through-holes 12A of the door 12 (FIG. 7). The slot 435 is adjacent to the bottom wall 431 (FIG. 5).

Two bolts 414 extend through the inner escutcheon 413 and are in threading connection with the two coupling pegs 518. Thus, the inner escutcheon 413 and the outer escutcheon 515 are fixed to two sides of the door 12 and, thus, not rotatable relative to the door 12.

The inner return mechanism 471 includes a mounting member 473 fixed in the inner assembling room 437 of the inner escutcheon 413 and a mounting seat 475 fixed to the mounting member 473. A sleeve 477 is rotatably mounted to the mounting seat 475. The sleeve 477 includes a longitudinal connecting hole 479 having square cross sections and a slit 491 in an outer periphery delimiting the longitudinal connecting hole 479. A push ring 493 is mounted around the sleeve 477 and includes a protrusion 495 coupled with the slit 491. Thus, the push ring 493 and the sleeve 477 are jointly rotatable. A torsion spring 497 is disposed between the push ring 493 and the sleeve 477 and biases the sleeve 477.

Furthermore, a main board 439 is disposed in the inner assembling room 437 of the inner escutcheon 413. The main board 439 is substantially located between the outer sidewall 415 of the inner escutcheon 413 and the inner return mechanism 471 (FIG. 7). The main board 439 includes an inner connecting seat 451 and a power connecting seat 455. Both the inner connecting seat 451 and the power connecting seat 455 extend through the bottom wall 431 and are accessible from the chamber 417.

An inner handle 499 is pivotably coupled with the inner escutcheon 413. An end of an inner spindle 511 has an end secured to the inner handle 499 to pivot therewith. Another end of the inner spindle 511 extends through the main board 439 and is coupled with the longitudinal connecting hole 479 of the sleeve 477. Furthermore, the longitudinal connecting hole 479 of the sleeve 477 is coupled with the driving rod 28. Thus, the inner handle 499, the inner spindle 511, the push ring 493, the driving rod 28, the actuating member 26, and the sleeve 477 can pivot jointly. Furthermore, the torsion spring 497 is used to retain the inner handle 4Y) in a horizontal state.

A power supply module 455 is disposed in the chamber 417 of the inner escutcheon 413. The power supply module 455 includes a power connector 457 in electrical connection with the power connecting seat 453 of the main board 439. The power supply module 455 provides power required for operation of the main board 439. The power supply module 455 can be, but not limited to, a battery module (such as a box receiving at least one AA battery). It is noted that when the power supply module 455 is received in the chamber 417, the maintenance hole 433 is covered by the power supply module 455 (FIG. 7). The maintenance hole 433 is revealed after the power supply module 455 is removed out of the chamber 417.

The inner operating device 411 further includes a protective cover 459 removably coupled to the inner escutcheon 413. The protective cover 459 substantially covers the outer side of the chamber 417 and can be secured by a bolt 460. The protective cover 459 covers the chamber 417, the power supply module 455, and the maintenance hole 433 (FIG. 7).

The input interface module 555 is in electrical connection with the main board 439 by a connecting cable 577 having an inner end 579 and an outer end 591. Specifically, the outer end 591 of the connecting cable 577 is electrically connected to the outer connecting seat 566 of the input interface module 555. The connecting cable 577 extends through the slot 532 of the outer escutcheon 515, the two second through-holes 12B of the door 12, and the slot 435 of the inner escutcheon 413. The inner end 579 is electrically connected to the inner connecting seat 451 of the main board 439 (FIG. 7). Thus, the main board 439 can supply power through the connecting cable 577 to the input interface module 555. Furthermore, the identification signals inputted via the input interface module 555 can be sent to the main board 439 via the connecting wire 577 for identification purposes.

The lock device 10 further comprises a clutch 60 disposed between the outer operating device 513 and the latch device 20. The clutch 60 includes an outer box 62 mounted to an inner side of the outer escutcheon 515. The outer box 62 includes a first portion 64 and a second portion 68 coupled with the first portion 64. The first portion 64 includes an axial hole 66. The second portion 68 includes a coupling hole 70 and a stop member 113 extending towards the first portion 64. A longitudinal axis of the coupling hole 70 is coincident with a longitudinal axis of the axial hole 66. Furthermore, the second portion 68 includes a limiting member 115 extending towards the first portion 64.

The clutch 60 further includes an intermediate member 74 pivotably mounted to the outer box 62 and a coupling member 117 pivotably mounted to the intermediate member 74. The intermediate member 74 includes an enlarged portion 76 having a first end face 78 and a second end face 80 spaced from the first end face 78 along the longitudinal axis of the axial hole 66. The intermediate member 74 further includes a spindle coupling portion 86 extending from the second end face 80. The enlarged portion 76 includes a mounting hole 82 extending from the first end face 78 along the axial hole 66 but spaced from the second end face 80. The mounting hole 82 includes an inner periphery 84. The enlarged portion 76 further includes a through-hole 90 extending radially from an outer periphery through the inner periphery 84 of the mounting hole 82. The spindle coupling portion 86 includes a connecting hole 88 extending along the longitudinal axis of the axial hole 66 and spaced from the mounting hole 82. The spindle coupling portion 86 of the intermediate member 74 is rotatably coupled with the axial hole 66 of the first portion 64. Thus, the pivotal axis of the intermediate member 74 is coincident with the longitudinal axis of the axial hole 66.

The coupling member 117 includes a first side 119 and a second side 131. The coupling member 117 further includes a coupling portion 138 extending along the pivotal axis of the intermediate member 74 from the first side 119 towards but spaced from the second side 131. The coupling member 117 further includes a pivotal portion 133 extending along the pivotal axis of the intermediate member 74 from the second side 131 to the coupling portion 138. The pivotal portion 133 includes an outer periphery 136 and an engaging groove 137 extending from the outer periphery 135 in a radial direction of the coupling member 117. The coupling member 117 further includes an engaging hole 140 extending along the pivotal axis of the intermediate member 74 from the first side 119 to the second side 131. The engaging hole 140 intercommunicates with the engaging groove 137.

The coupling portion 138 of the coupling member 117 is pivotably coupled with the coupling hole 70 of the second portion 68. Furthermore, the pivotal portion 133 is pivotably coupled with the mounting hole 82 of the intermediate member 74. Thus, the coupling member 117 can pivot independently relative to the intermediate member 74.

The clutch 60 further includes a spindle 92, an actuating member 96, and a torsion spring 110. An end of the spindle 92 is coupled with the mounting hole 88 of the spindle coupling portion 86, and a pin 94 extends through the spindle 92 and the spindle coupling portion 86 for securing purposes. Thus, the spindle 92 and the intermediate member 74 can pivot jointly, and the end of the spindle 92 is located outside of the first portion 64.

The actuating member 96 is mounted to the second end face 80 of the intermediate member 74 to pivot therewith. The actuating member 96 includes a push block 98 extending towards the first portion 64. The torsion spring 110 is mounted around the spindle coupling portion 86 of the intermediate member 74. Two ends 111 of the torsion spring 110 abut against two sides of the stop member 113, and the push block 98 is located between the two ends 111. Thus, the push block 98 is pressed by the two ends 111 of the torsion spring 110 to bias the intermediate member 74 to an initial position (see FIG. 7). When the intermediate member 74 is in the initial position, a lever of the outer handle 514 is in a horizontal state, and a side of the enlarged portion 76 of the intermediate member 74 abuts the limiting member 115, pivotal movement in a single direction is permitted w % ben the intermediate member 74 is in the initial position.

Figure 13:
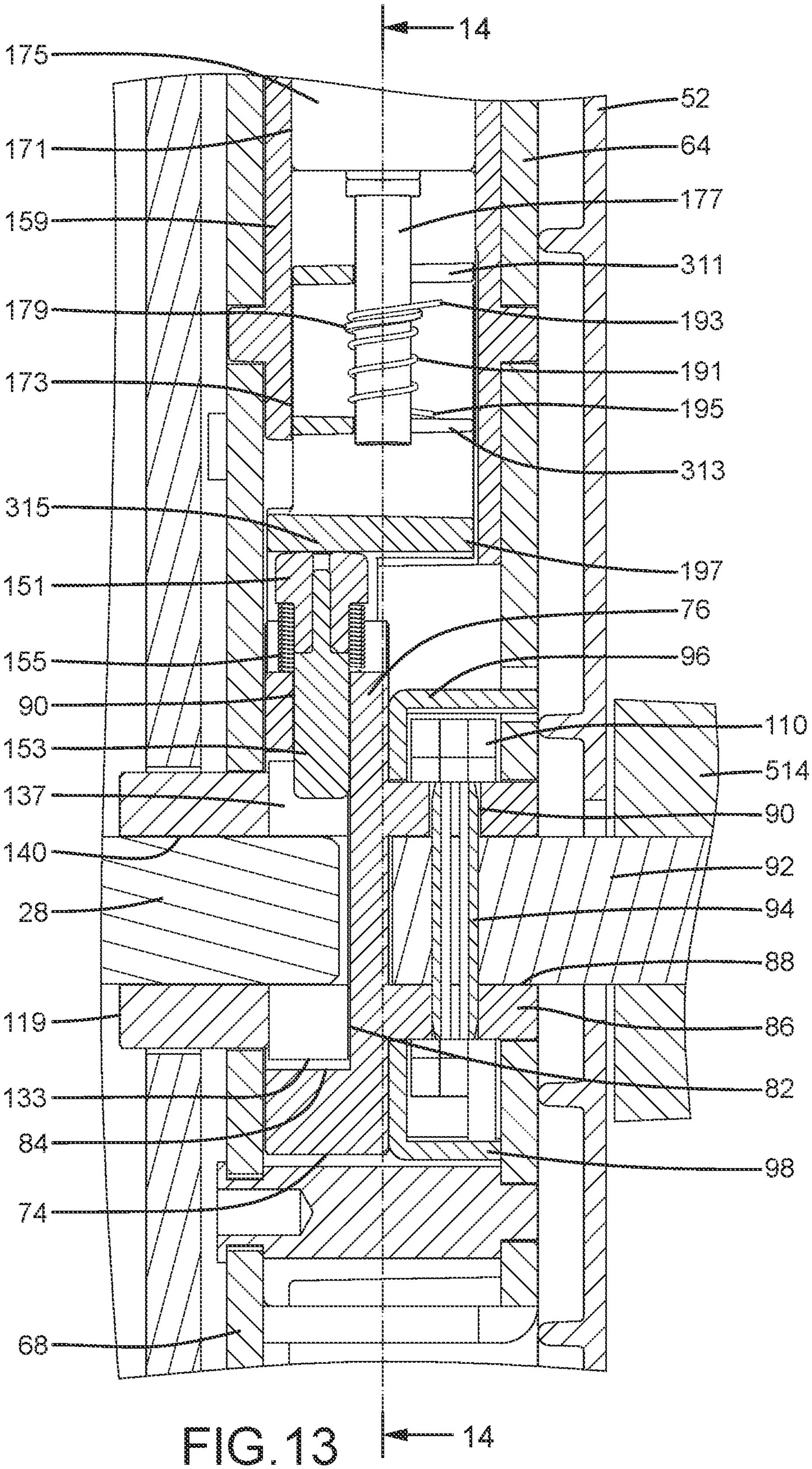
FIG. 13 is a partial, cross sectional view illustrating the clutch member in an engagement position.

The clutch 60 further includes a clutch member 139 movably coupled with the intermediate member 74 and jointly pivotable with the intermediate member 74. The clutch member 139 includes an abutting portion 151 made of plastic material and an engaging arm 153 made of metal material. The abutting portion 151 may be slightly larger than the engaging arm 153. The abutting portion 151 is located on an outer side of the intermediate member 74. The engaging arm 153 is movably received in the through-hole 90 of the intermediate member 74. Thus, the clutch member 139 can move along a longitudinal axis of the through-hole 90 between a disengagement position (FIGS. 9-11) and an engagement position (FIGS. 13-15). Furthermore, a supporting spring 155 is disposed around the engaging arm 153 and between the abutting portion 151 and the intermediate member 74. The supporting spring 155 biases the clutch member 139 to the disengagement position.

The clutch 60 further includes a driving device 157 for driving the clutch member 139. The driving device 157 includes an inner box 159 mounted between the first and second portions 64 and 68 of the outer box 62. The inner box 159 includes a receiving groove 171 and a sliding groove 173 extending from an end of the receiving groove 171 to an outer surface of the inner box 159. A motor 175 is received in the receiving groove 171 and can be supplied with electricity for operation. The motor 175 includes a rotor coupled to a shaft 177 to rotate jointly. The motor 175 is electrically connected to the main board 439. Thus, the rotor can be driven to rotate in a first (forward) direction or a second (reverse) direction upon control by the main board 439. The shaft 177 includes a threaded section 179 at an outer periphery thereof. The threaded section 179 has one turn. A helical elastic element 191 is mounted around the shaft 177. The helical elastic element 191 includes a first tang 193 extending along a tangential direction of an end of the helical elastic element 191 and a second tang 195 extending along a tangential direction of another end of the helical elastic element 191. The helical elastic element 191 is in threading connection with the threaded section 179 of the shaft 177. In an embodiment, the helical elastic element 191 is a compression spring, and the first and second tangs 193 and 195 are rectilinear sections extending from two ends of the compression spring.

The driving device 157 further includes a sliding block 197 movably coupled with the inner box 159. The sliding block 197 includes an inner end 314 and an activation end 315. The sliding block 197 further includes a compartment 199 between the inner end 314 and the activation end 315. The compartment 199 includes first and second walls 311 and wall 313 in the inner end 314. The second wall 313 is located between the first wall 311 and the activation end 315 along the longitudinal axis of the shaft 177. The activation end 315 includes an extension arm 317 extending in a circumferential direction about a pivotal axis of the intermediate member 74 towards two sides of the sliding block 197.

The sliding block 197 is slidably received in the sliding groove 173. The extension arm 317 is located outside of the inner box 159. The abutting portion 151 of the clutch member 139 abuts against the activation end 315 of the sliding block 197. The shaft 177 and the helical elastic element 191 are located in the compartment 199. The first tang 193 of the helical elastic element 191 is adjacent to the first wall 311. The second tang 195 of the helical elastic element 191 is adjacent to the second wall 313. Thus, when the shaft 177 rotates, the first and second tangs 193 and 195 of the helical elastic element 191 are restrained by the compartment 199 and, thus, cannot rotate jointly with the shaft 177. As a result, when the shaft 177 rotates, the threaded section 179 pushes the helical elastic element 191 in an uncompressed state to move along the shaft 177.

Figure 9:
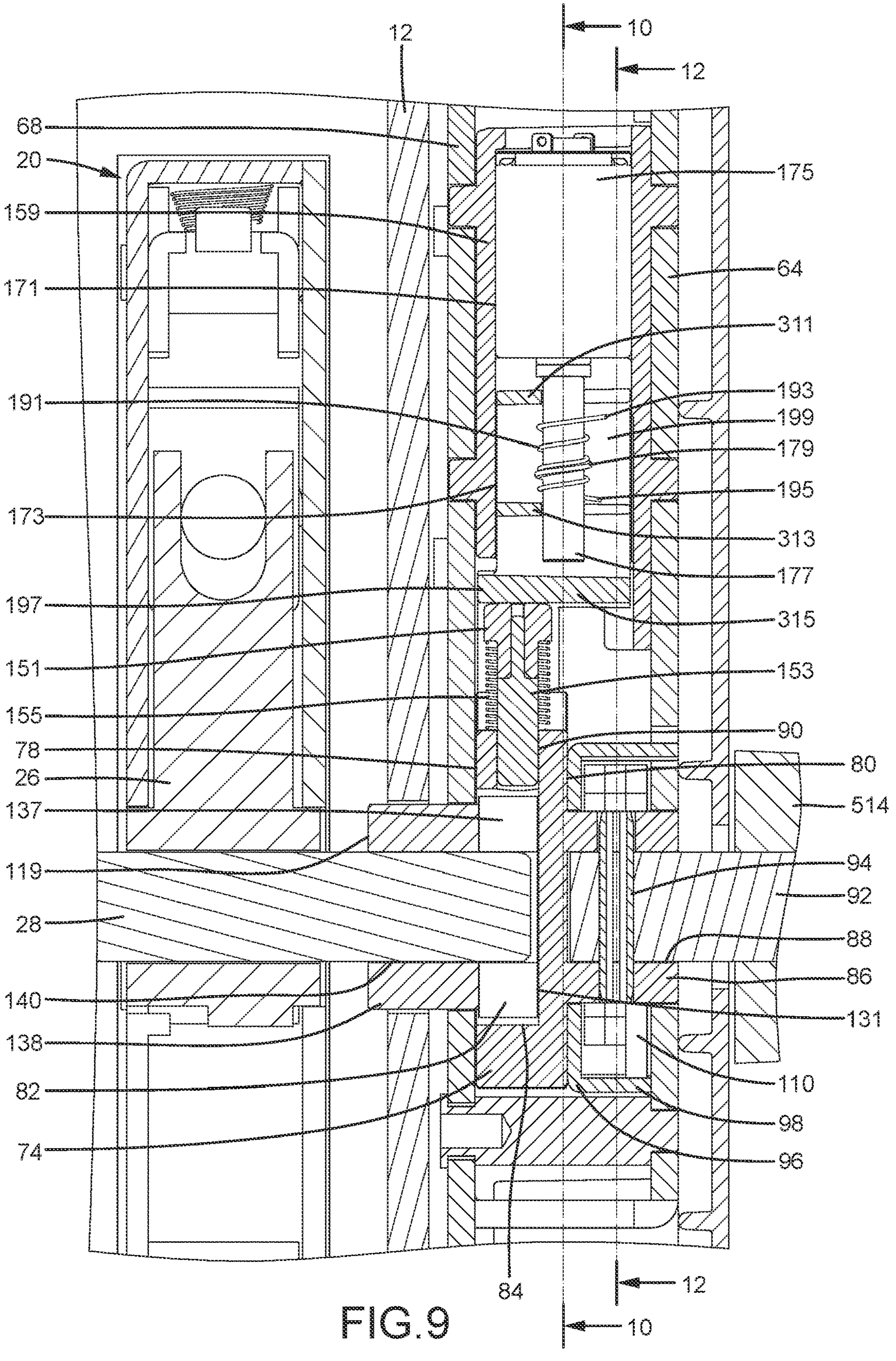
FIG. 9 is a partial, cross sectional view taken along section line 9-9 of FIG. 6, illustrating the clutch and corresponding components.
Figure 10:
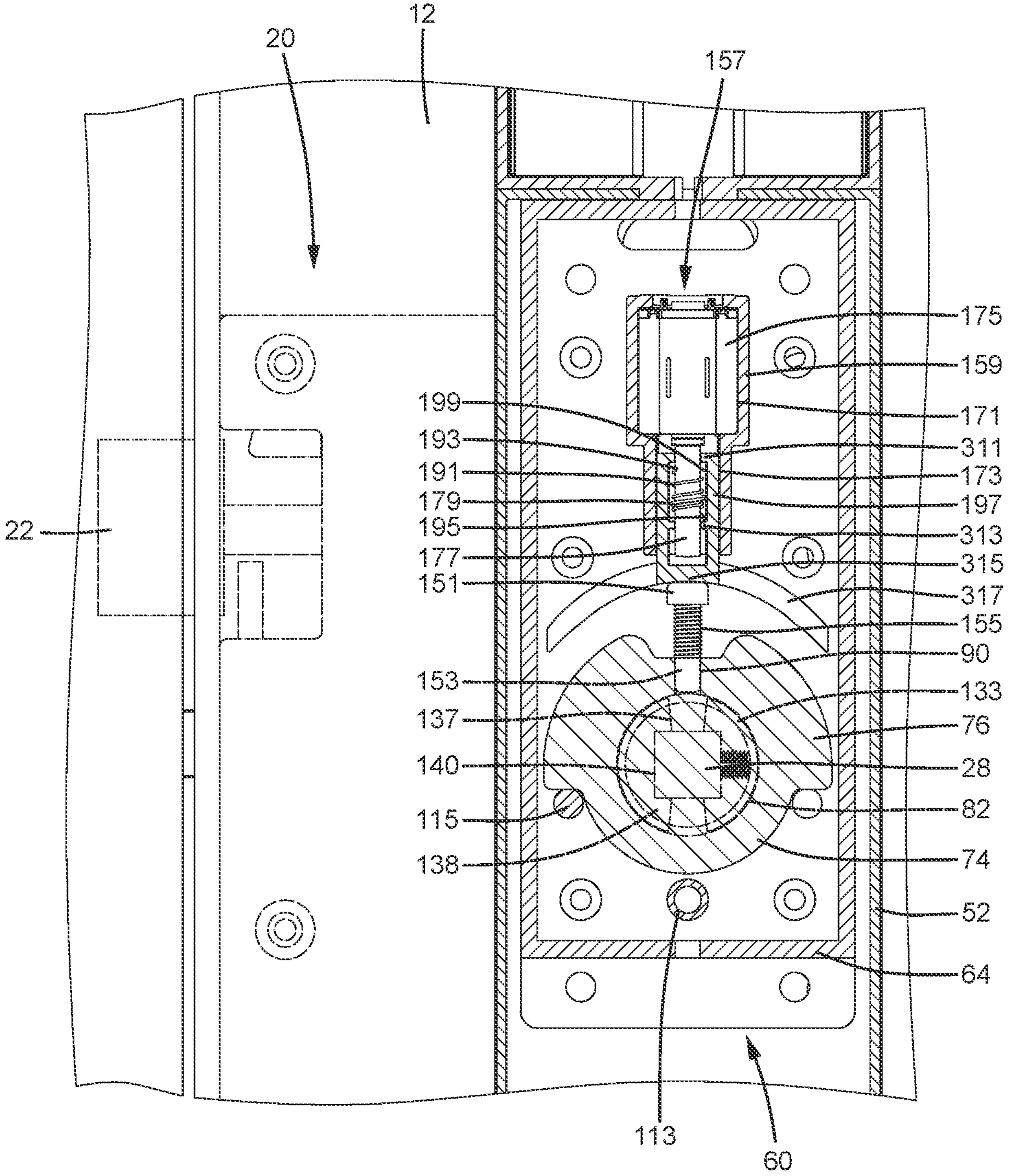
FIG. 10 is a cross sectional view taken along section line 10-10 of FIG. 9.
Figure 11:
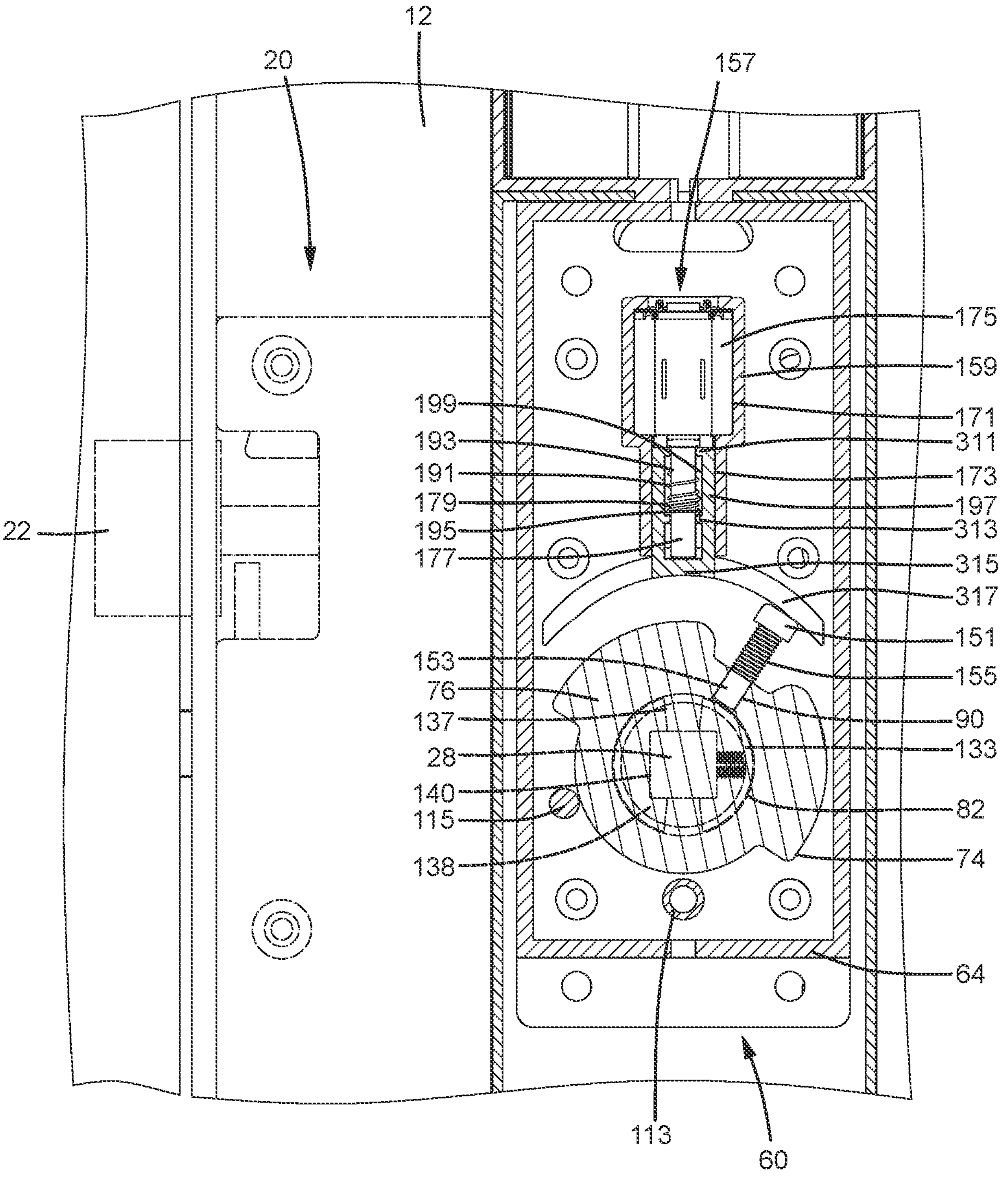
FIG. 11 is a view similar to FIG. 10 with a clutch member in a disengagement position and with an outer handle pivoted.
Figure 12:
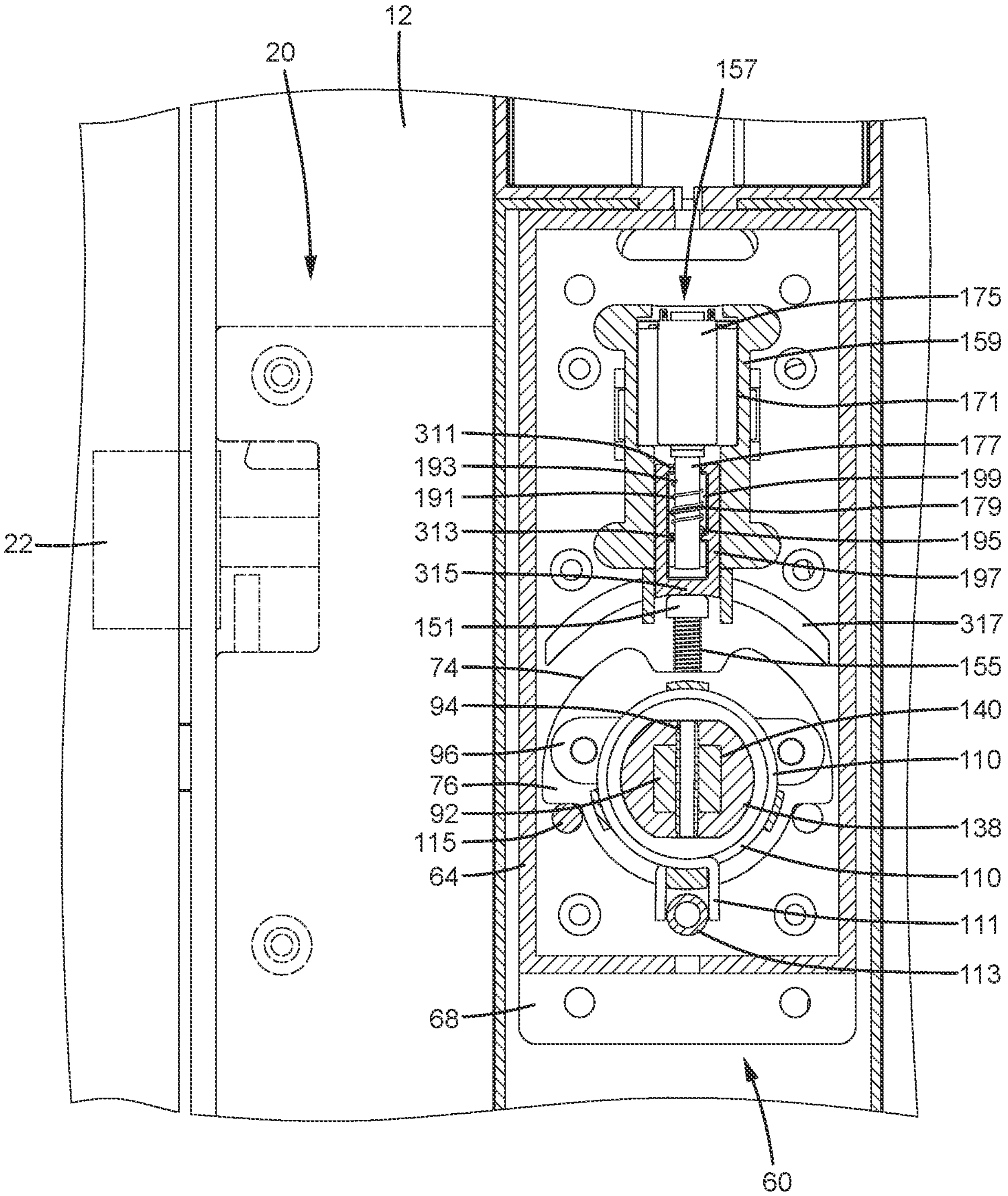
FIG. 12 is a cross sectional view taken along section line 12-12 of FIG. 9.

When the shaft 177 rotates in the first direction, the helical elastic element 191 moves towards the intermediate member 74, and the second tang 195 abuts against the second wall 311 of the sliding block 197, such that the sliding block 197 can be pushed towards the intermediate member 74. Thus, the clutch member 139 moves from the disengagement position (FIGS. 9 and 10) to the engagement position (FIGS. 13 and 14). When the shaft 177 rotates in the second direction reverse to the first direction, the helical elastic element 191 moves away from the intermediate member 74, and the first tang 193 abuts against the first wall 311 of the sliding block 197, such that the sliding block 197 can be pushed away from the intermediate member 74. Thus, the clutch member 139 is biased by the supporting spring 155 to move from the engagement position (FIGS. 13 and 14) to the disengagement position (FIGS. 9 and 10).

The clutch 60 is securely disposed in the outer assembling room 539 of the outer escutcheon 515 by the second portion 68. The driving rod 28 of the latch device 20 is coupled with the engaging hole 140 of the coupling member 117 to pivot jointly. An end of the outer spindle 92 on an outer side of the outer escutcheon 515 is jointly pivotable with the outer handle 514 (FIG. 9). Thus, when the outer handle 514 is not subject to any external force, the intermediate member 74 is retained in the initial position under the bias of the torsion spring 110. As a result, the lever of the outer handle 514 is substantially in the horizontal direction. When the outer handle 514 is pivoted, the actuating member 96 pivots, such that the push block 98 presses against one of the two ends 111 of the torsion spring 111. When the outer handle 514 is released, the torsion spring 110 returns the actuation member 96 as well as the intermediate member 74 and the outer handle 514.

With reference to FIGS. 5-8, for ease of explanation, it is assumed that the input interface module 555 is a wireless input device utilizing Blue-tooth technology. After the lock device 10 is connected with the input interface module 555 via a smart mobile device using Blue-tooth technology, an identification information (such as a biological feature, a password, etc.) is inputted via the smart mobile device for identification. Then, the unlocking command is sent to the input interface module 555, which, in turn, transmits the unlocking command to the main board 439. The main board 439 processes the unlocking command, such that the unlocking command can be executed directly or after decoding.

It is further assumed that the door 12 is closed, the latch 22 of the latch device 20 is in the latching position engaged with the door frame around the door 12. The intermediate member 74 is in the initial position. The engaging groove 137 of the coupling member 117 is aligned with the engaging arm 153 of the clutch member 139. The clutch member 139 is in the disengagement position.

When the clutch member 139 is in the disengagement position, the intermediate member 74 cannot pivot together with the coupling member 117. Thus, when the outer handle 514 is pivoted, the spindle 92 is actuated to cause pivotal movement of the intermediate member 74 and the push block 98. During pivotal movement of the intermediate member 74, the coupling member 117 remains still. Thus, the actuating member 26 and the driving rod 28 of the latch device 20 also remains still, such that the clutch member 139 in the disengagement position does not permit opening of the door 12 by operating the outer handle 514. This provides a locking function for the outer side of the door 12 (such as an outdoor condition).

It is noted that even though the clutch member 139 is in the disengagement position, when the inner handle 499 pivots, the inner connecting member 511 is actuated to cause pivotal movement of the sleeve 477 of the inner return mechanism 471, which, in turn, causes pivotal movement of the driving rod 28 and the actuating member 26, such that the latch 22 moves from the latching position to the unlatching position, permitting opening of the door 12.

Assuming that the biological feature inputted via the smart mobile device is identified as being correct, the motor 175 of the driving device 157 of the clutch 60 rotates in the first direction. With reference to FIGS. 13 and 14, the threaded section 179 of the shaft 177 pushes the helical elastic element 191 towards the intermediate member 74. The second tang 195 of the helical elastic element 191 pushes the sliding block 197 towards the intermediate member 74, and the activation end 315 of the sliding block 197 actuates the clutch member 139 to move from the disengagement position to the engagement position. The engaging arm 153 of the clutch member 139 engages with the engaging groove 137 of the coupling member 117.

With reference to FIG. 15, in a case that the engaging arm 153 engages with the engaging groove 137 of the coupling member 117, when the outer handle 514 is pivoted to cause pivotal movement of the intermediate member 74, the clutch member 139, and the actuating member %, the actuating member 96 pushes the torsion spring 111 to store elastic force, and the clutch member 139 pushes the coupling member 117 to pivot, thereby causing pivotal movement of the driving rod 28 and the actuating member 26. Thus, the latch 22 moves from the latching position to the unlatching position. Furthermore, with the clutch member 139 in the engagement position, pivotal movement of the inner handle 499 moves the latch 22 from the latching position to the unlatching position.

With the clutch 139 in the engagement position, when the motor 175 drives the shaft 177 to rotate in the second direction (for example, a person moves from the outer side of the door 12 into the inner side of the door 12 or the period of time of the clutch member 139 in the engagement position exceeds a preset time period), the helical elastic element 191 moves away from the intermediate member 74 along the shaft 177. Furthermore, the first tang 193 of the helical elastic element 191 presses against the first wall 311 of the sliding block 197, moving the sliding block 197 away from the intermediate member 74, such that the supporting spring 155 pushes the clutch member 139 from the engagement position to the disengagement position. Thus, the outer handle 514 returns to the position incapable of moving the latch 22 from the latching position to the unlatching position.

Figure 16:
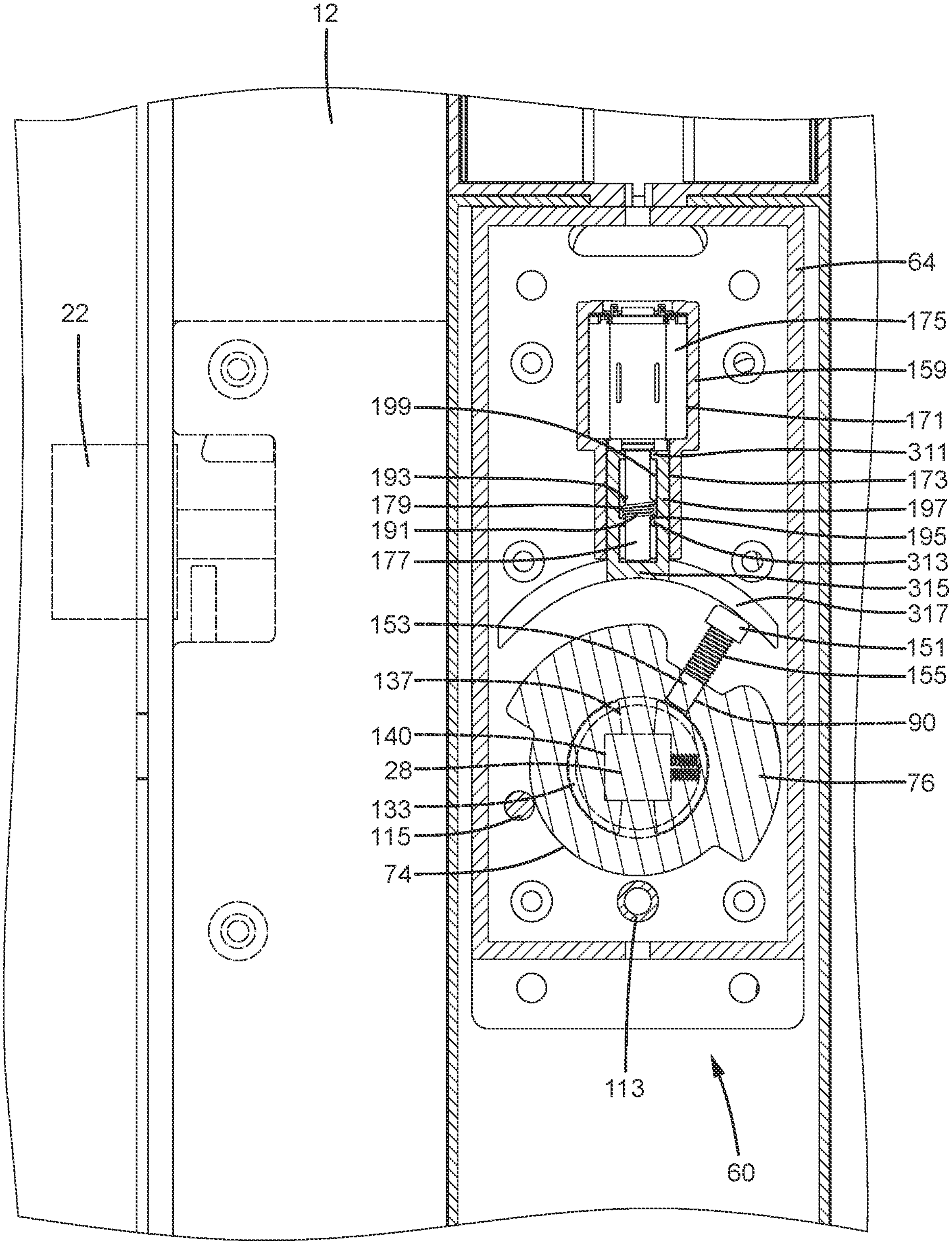
FIG. 16 is a diagrammatic view illustrating compression of a helical compression spring under rotation of a shaft driven by a motor to rotate in a first direction while the clutch member is prevented from being moved to the engagement position.

With reference to FIG. 16, assuming the door 12 is closed, the latch 22 is in the latching position, and the clutch member 139 is in the disengagement position, when the outer handle 514 is pivoted, the motor 175 rotates in the first direction to move the helical elastic element 191 along the shaft 177 towards the intermediate member 74 (such as the biological feature inputted via the smart mobile device is identified as being correct). Since the clutch member 139 is misaligned from the engaging groove 137, the clutch member 139 is retained in the disengagement position. Furthermore, since the extension arm 317 of the sliding block 197 abuts against the abutting portion 151 of the clutch member 139, the sliding block 197 cannot move towards the intermediate member 74, such that movement of the helical elastic element 191 towards the intermediate member 74 causes compression of the helical elastic element 19 by the threaded section 179 of the shaft 177 and the second wall 313 of the sliding block 197, storing elastic force. With the helical elastic element 191 in the compressed state, when the intermediate member 74 returns to the initial position (for example, the outer handle 514 is released), the clutch member 139 is aligned with the engaging groove 137 of the coupling member 117. The helical elastic element 191 pushes the sliding block 197 towards the intermediate member 74 under the action of the elastic force, such that the clutch member 139 moves from the disengagement position to the engagement position. The outer handle 514 can be used to actuate the latch 22 to move from the latching position to the unlatching position.

With reference to FIGS. 7 and 8, when it is desired to maintain or replace the input interface module 555, the screws 460 of the inner operating device 411 are removed to permit detachment of the protective cover 459 from the inner escutcheon 413, revealing the power supply module 455. In this state, the power supply module 455 can be removed from the chamber 417 (the power connector 457 can be either connected with or disconnected from the power connecting seat 453). Specifically, the maintenance hole 433 is not shielded by the power supply module 455. Since the socket 535 is aligned with the maintenance hole 433 and the two first through-holes 12A of the door 12, a tool 14 can be inserted from a side of the inner operating device 411 through the maintenance hole 433 and the two first through-holes 12A of the door 12 and engages with the fastener 551. Then, the tool 14 can be rotated to disengage the fastener 551 from the connecting member 563 of the input interface module 555. The input interface module 555 can be disengaged from the outer escutcheon 515, and the outer end 591 of the connecting cable 577 can be disconnected from the outer connecting seat 566.

The input interface module 555 according to the present invention can be rapidly and easily installed or removed after detaching the protective cover 459 without removing the inner operating device 411, the outer operating device 513, and the latch device 20. This is extremely convenient when maintenance of the input interface module 555 or replacement of an input interface module 555 of another type (such as including an input device with buttons, a biological feature input device, etc.) is required. Also, the manufacturers can benefited in reduction of the manufacturing costs by modularization.

The input interface module 555 according to the present invention can be installed or removed after the protective cover 459 at the inner side of the door 12 is detached from the inner escutcheon 413. This provides an anti-theft effect (preventing the input interface module 555 from being stolen) and safety while permitting easy and rapid installation and removal of the input interface module 555.

The main board 439 for controlling operation of the clutch 60 and/or identification of the identification information is separate from the input interface module 555 and is mounted in the inner assembling room 437 of the inner escutcheon 413, reducing the chance of cracking or destruction of the lock device 10.

The fastener 551 cooperates with the disengagement prevention member 553 that is rotatably and non-removably disposed on the socket 535, such that the input interface module 555 can be installed and removed more conveniently.

According to the illustrated embodiments, the clutch 60 and the inner and outer operating devices 411 and 513 may be varied without altering the latch device 20, providing electronic control of the mechanical type latch device 20 to achieve the locking function (such that the latch 22 cannot move to the unlatching position by operating the outer handle 514) or the unlocking function (such that the latch 22 can move to the unlatching position by operating the outer handle 514). Thus, redesigning and corresponding manufacturing of the latch device 20 for electronic control are not required. Namely, currently available mechanical type latch device 20 can be used, reducing the costs of manufacturing and design. For general consumers, the mechanical type latch device 20 can still be used to achieve electronic control by replacing the inner and outer operating devices 411 and 513.

The threaded section 179 of the shaft 177 include only one turn, which causes less restriction to the helical elastic element 191. Thus, the compression extent of the helical elastic element 191 along the longitudinal axis of the shaft 177 may be maximized. The motor 175 can still rotate in the first direction when the clutch member 139 cannot move, reducing damage to the motor 175 resulting from erroneous operation.

The abutting portion 151 of the clutch member 139 may be made of plastic material, such that the friction between the abutting portion 151 and the sliding block 197 can be reduced during rotation of the intermediate member 74, permitting smoother operation of the outer handle 514.

Now that the basic teachings of the present invention have been explained, many extensions and variations will be obvious to one having ordinary skill in the art. For example, the smart mobile device may directly transmit the inputted identification information to the input interface module 555, which, in turn, transmits the received identification information to the main board 439 for identification. It can be appreciated that modification of the identification by the door lock 10 or the smart mobile device is an obvious change within the scope of the invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A door lock comprising:

a latch device including a latch movable between a latching position and an unlatching position;

an inner operating device mounted to a side of the latch device and is configured to move the latch between the latching position and the unlatching position, wherein the inner operating device includes an inner escutcheon having a maintenance hole;

an outer operating device mounted to another side of the latch device and is configured to move the latch between the latching position and the unlatching position, wherein the outer operating device includes an outer escutcheon having a mounting area, and wherein the mounting area includes a socket aligned with the maintenance hole;

a main board fixed in the inner escutcheon, wherein the main board is configured to control the outer operating device to or not to move the latch between the latching position and the unlatching position;

a fastener rotatably coupled with the socket; and an input interface module removably mounted in the mounting area and electrically connectable with the main board, wherein the input interface module is configured to permit input of an unlocking identification information or an unlocking command by a physical or wireless measure, wherein the input interface module includes a connecting member, wherein when the maintenance hole is revealed, the fastener is rotatable to tighten or loosen the connecting member of the input interface module, wherein when the connecting member is tightened by the fastener, the input interface module is secured in the mounting area, and wherein when the fastener is disengaged from the connecting member, the input interface module is removable from the outer escutcheon, wherein the input interface module further includes:

a box including a fixing hole and a compartment spaced from the fixing hole, wherein the box further includes a coupling portion at a bottom thereof, wherein the outer escutcheon further includes a vertical wall and a bottom wall contiguous to the vertical wall and the mounting area, wherein the outer escutcheon further includes a slot extending from the vertical wall and an insertion groove extending from the bottom wall, wherein the coupling portion of the box is removably coupled with the insertion groove, and wherein the connecting member is coupled with the fixing hole;

a circuit board securely disposed in the box, wherein the circuit board includes an outer connecting seat received in the compartment; and a connecting cable including an outer end and an inner end, wherein the outer end extends through the slot of the outer escutcheon and is in electrical connection with the outer connecting seat, and wherein the inner end of the connecting cable is in electrical connection with the main board.

2. The door lock as claimed in claim 1, wherein the box further includes a stop portion formed on an outer periphery of the fixing hole, wherein the connecting member includes an enlarged head having non-circular cross sections, and wherein the enlarged head abuts against the stop portion to prevent rotation of the connecting member relative to the fixing hole.

3. The door lock as claimed in claim 1, wherein the input interface module is an input device using a plurality of buttons, a biological feature input device, or a wireless input device.

4. The door lock as claimed in claim 3, wherein the input device using the plurality of buttons includes a plurality of physical buttons or a touch screen with a plurality of virtual buttons displayed on the touch screen.

5. The door lock as claimed in claim 3, wherein the biological feature input device is a fingerprint input device, a facial feature input device, an iris image input device, or an audio input device.

6. The door lock as claimed in claim 3, wherein the wireless input device is a device using Wi-Fi, Bluetooth, radio frequency identification, or near field communication.

7. The door lock as claimed in claim 1, further comprising:

a power supply module, wherein the inner escutcheon includes an inner assembling room and an outer sidewall contiguous to the inner assembling room, wherein the inner escutcheon further includes a chamber extending from the outer sidewall and spaced from the inner assembling room, wherein the inner escutcheon further includes a vertical inner wall contiguous to the chamber and spaced from the outer sidewall, wherein the power supply module is received in the chamber, wherein the main board is securely disposed in the inner assembling room, and wherein the power supply module is electrically connected to and provides power to the main board; and a protective cover removably coupled to the inner escutcheon and covering the chamber, wherein when the protective cover is detached from the inner escutcheon, the power supply module is movable to reveal the maintenance hole.

8. The door lock as claimed in claim 1, further comprising a connecting cable having an inner end and an outer end, wherein the inner escutcheon includes an inner assembling room and an outer sidewall contiguous to the inner assembling room, wherein the inner escutcheon further includes a chamber extending from the outer sidewall and spaced from the inner assembling room, wherein the inner escutcheon further includes a vertical inner wall contiguous to the chamber and spaced from the outer sidewall, wherein the main board is securely disposed in the inner assembling room and includes an inner connecting seat extending into the chamber, wherein the vertical inner wall includes a slot spaced from the maintenance hole, wherein the inner end of the connecting cable extends through the slot and is in electrical connection with the inner connecting seat, and wherein the outer end of the connecting cable is in electrical connection with the input interface module.

9. The door lock as claimed in claim 8, wherein the outer escutcheon further includes a vertical wall contiguous to the mounting area, wherein the outer escutcheon further includes a slot extending from the vertical wall, wherein the input interface module further includes an outer connecting seat adjacent to the slot, and wherein the outer end of the connecting cable extends through the slot of the outer escutcheon and is in electrical connection with the outer connecting seat.

10. The door lock as claimed in claim 8, wherein the inner operating device further includes an inner return mechanism and an inner handle operatively connected to the inner return mechanism, wherein the inner return mechanism is securely disposed to the inner escutcheon and is located in the inner assembling room, wherein the main board is located between the inner return mechanism and the outer sidewall of the inner escutcheon, and wherein the inner return mechanism biases the inner handle to retain the latch in the latching position.

11. The door lock as claimed in claim 1, further comprising a disengagement prevention member, wherein the outer escutcheon further includes a vertical wall contiguous to the mounting area, wherein the socket extends from the vertical wall towards the latch device, wherein the socket further includes a groove, wherein the fastener includes a threaded section and a head, wherein the head is located outside of the socket and faces the inner operating device, wherein the threaded section is located in the groove, wherein the disengagement prevention member and the fastener are jointly and rotatably mounted around the threaded section.

12. A door lock comprising:

a latch device including a latch movable between a latching position and an unlatching position;

an inner operating device mounted to a side of the latch device and is configured to move the latch between the latching position and the unlatching position, wherein the inner operating device includes an inner escutcheon having a maintenance hole;

an outer operating device mounted to another side of the latch device and is configured to move the latch between the latching position and the unlatching position, wherein the outer operating device includes an outer escutcheon having a mounting area, and wherein the mounting area includes a socket aligned with the maintenance hole;

a main board fixed in the inner escutcheon, wherein the main board is configured to control the outer operating device to or not to move the latch between the latching position and the unlatching position;

a fastener rotatably coupled with the socket;

an input interface module removably mounted in the mounting area and electrically connectable with the main board, wherein the input interface module is configured to permit input of an unlocking identification information or an unlocking command by a physical or wireless measure, wherein the input interface module includes a connecting member, wherein when the maintenance hole is revealed, the fastener is rotatable to tighten or loosen the connecting member of the input interface module, wherein when the connecting member is tightened by the fastener, the input interface module is secured in the mounting area, and wherein when the fastener is disengaged from the connecting member, the input interface module is removable from the outer escutcheon; and a clutch in electrical connection with the main board and including:

an outer box;

an intermediate member pivotably connected to the outer box, wherein the intermediate member is configured to couple with an outer handle of the outer operating device to pivot therewith;

a torsion spring disposed between the intermediate member and the outer box, wherein the torsion spring biases the intermediate member to an initial position; and a coupling member pivotably mounted between the intermediate member and the outer box, wherein the coupling member is configured to be operatively connected to the latch of the latch device, wherein the main board controls the coupling member to or not to pivot jointly with the intermediate member, wherein when the coupling member and the intermediate member are jointly pivotable, pivotal movement of the outer handle causes the latch to move from the latching position or the unlatching position, and wherein when the coupling member is not jointly pivotable with the intermediate member, pivotal movement of the outer handle is incapable of causing movement of the latch, wherein the clutch further includes a clutch member movably coupled to the intermediate member and jointly pivotable with the intermediate member, wherein the clutch member includes an engaging arm, wherein the clutch member is movable along a pivotal axis of the intermediate member between an engagement position and a disengagement position, wherein when the clutch member is in the engagement position, the coupling member and the intermediate member are jointly pivotable, and wherein when the clutch member is in the disengagement position, the coupling member is incapable of pivoting jointly with the intermediate member, wherein the clutch further includes a driving device in electrical connection with the main board, wherein the driving device includes:

a motor configured to be driven by the main board;

a shaft configured to be driven by the motor to rotate, wherein the shaft includes an outer periphery having a threaded section;

a helical elastic element in threading connection with the threaded section of the shaft, wherein the helical elastic element is compressible and includes a first tang and a second tang, wherein the helical elastic element moves along a longitudinal axis of the shaft when the shaft rotates; and a sliding block including a compartment having first and second walls opposite to each other, wherein the sliding block further includes an activation end located outside of the compartment, wherein the second wall is located between the first wall and the activation end along the longitudinal axis of the shaft, wherein the sliding block further includes an extension arm extending from the activation arm, wherein the shaft is received in the compartment, wherein the first tang of the helical elastic element is adjacent to the first wall, wherein the second tang of the helical elastic element is adjacent to the second wall, wherein the first tang and the second tang are configured to be restricted and retained in place by the first and second walls when the shaft rotates, wherein when the helical elastic element moves and the first tang abuts against the first wall, the sliding block moves away from the intermediate member along the longitudinal axis of the shaft, and the clutch member moves to the disengagement position, wherein when the helical elastic element moves and the second tang abuts against the second wall, the sliding block moves towards the intermediate member along the longitudinal axis of the shaft, and the clutch member moves to the engagement position, wherein when the clutch member is not aligned with the engaging groove and the helical elastic element moves towards the intermediate member, a section of the helical elastic element between the threaded section and the second tang is compressed by the threaded section and the second wall.

13. The door lock as claimed in claim 12, wherein the threaded section of the shaft has one turn, wherein the helical elastic element is a compression spring, wherein each of the first and second tangs is rectilinear and extends in a tangential direction of an associated one of two ends of the compression spring.

* * * * *